United States Patent [19]

Tsuchikawa et al.

[11] Patent Number: 5,748,775
[45] Date of Patent: May 5, 1998

[54] METHOD AND APPARATUS FOR MOVING OBJECT EXTRACTION BASED ON BACKGROUND SUBTRACTION

[75] Inventors: Megumu Tsuchikawa; Atsushi Sato; Akira Tomono; Kenichiro Ishii, all of Kanagawaken, Japan

[73] Assignee: Nippon Telegraph and Telephone Corporation, Tokyo, Japan

[21] Appl. No.: 401,972

[22] Filed: Mar. 9, 1995

[30] Foreign Application Priority Data

Mar. 9, 1994 [JP] Japan .................. 6-037438
Feb. 17, 1995 [JP] Japan .................. 7-029220

[51] Int. Cl.$^6$ .................. G06K 9/00; G06K 9/46
[52] U.S. Cl. .................. 382/190; 382/171; 382/170
[58] Field of Search .................. 382/168, 169, 382/170, 171, 172, 190, 192, 309

[56] References Cited

U.S. PATENT DOCUMENTS

| 4,075,604 | 2/1978 | Degasperi | 382/165 |
|---|---|---|---|
| 4,741,046 | 4/1988 | Matsunawa et al. | 382/176 |
| 4,807,163 | 2/1989 | Gibbons | 364/555 |
| 4,847,677 | 7/1989 | Music et al. | 348/391 |
| 5,027,413 | 6/1991 | Barnard | 382/103 |
| 5,150,432 | 9/1992 | Ueno et al. | 382/250 |

FOREIGN PATENT DOCUMENTS

| 63-194477 | 8/1988 | Japan | H04N 5/262 |
|---|---|---|---|
| 5225341 | 9/1993 | Japan | G06F 15/70 |
| 622318 | 1/1994 | Japan | H04N 7/18 |
| 652311 | 2/1994 | Japan | G06F 15/70 |
| 9112584 | 8/1991 | WIPO | G06F 15/70 |
| 9203801 | 3/1992 | WIPO | G06F 15/70 |

OTHER PUBLICATIONS

M. Kaneta et al., *Image Processing Method for Intruder Detection Around Power Line Towers*, IEICE Transactions on Information and Systems, Oct. 1993, pp. 1153–1161.

X. Yuan et al., *A Computer Vision System for Measurement of Pedestrian Volume*, Proceedings of the Region Ten Conference (TENCON), Oct. 19–21, 1993, pp. 1046–1049.

R.D. Horton, *A Target Cueing and Tracking System (TCATS) for Smart Video Processing*, Proceedings The Institute of Electrical and Electronic Engineers, 1990 International Carnahan Conference on Security Technology: Crime Countermeasures, Oct. 10–12, 1990, pp. 68–72.

*Primary Examiner*—Leo Boudreau
*Assistant Examiner*—Wenpeng Chen
*Attorney, Agent, or Firm*—Banner & Witcoff, Ltd.

[57] ABSTRACT

A moving object extraction based on background subtraction capable of stably extracting the moving object under various environments. Temporal changes of image feature parameter values for sub-regions subdividing a frame of each input image are stored, and the background image is reconstructed by statistically processing a temporal change of the image feature parameter values for each sub-region within a prescribed target region of the frame over a prescribed period of time to obtain the statistical quantity characterizing that temporal change, judging whether that temporal change is due to an illumination change or not according to the obtained statistical quantity and a prescribed illumination change judging condition, and updating a background image value for each sub-region by a new background image value according to the image feature parameter values for each sub-region during the prescribed period of time. Then, a subtraction processing is applied to one of the input images and the reconstructed background image, and a binarization processing is applied to the obtained subtraction image so as to extract the moving object region from the input images.

40 Claims, 21 Drawing Sheets

720 SLIT
710 IMAGE SEQUENCE

SAMPLING POSITION

730

742 INPUT
741 BACKGROUND

740

751 MOVING OBJECT

750

METHOD AND APPARATUS FOR MOVING OBJECT EXTRACTION BASED ON BACKGROUND SUBTRACTION

BACKGROUND OF THE INVENTION

1. Field of the Invention

The present invention relates to a method and an apparatus for extracting a moving object in the image sequence by using a subtraction between an input image and a background image, which can stably extract the moving object region even under an environment which incorporates illumination changes.

2. Description of the Background Art

Conventionally known methods for extracting a moving object based on image processing include: (1) a method for storing a reference background image, extracting difference data by a subtraction between the input image and the background image, and obtaining the moving object by means of the binarization of the difference data using a threshold; (2) a method for obtaining data on difference between frames by a subtraction between the input image and an immediately previous frame image as a reference image, and obtaining the moving object by means of the binarization of the obtained data; (3) a method for obtaining correspondences between changing points in the reference image and the input image by calculating quantities such as motion vectors, and obtaining the moving object as a set of moved points; (4) a method for obtaining a change between the reference image and the input image according to a correlation within a target region, and obtaining the moving object as a changed region; and (5) a method for carrying out a (shape) recognition and a tracking of a moving target.

Among these conventionally known methods, the methods based on subtraction have an advantage that the moving object can be extracted at high speed by means of a relatively simple processing, and widely used in various fields such as the industrial product inspection and measurement, the automobile measurement, and the monitoring system.

FIG. 1 shows an outline of such a conventional method for extracting the moving object based on background subtraction, where the moving object is extracted by obtaining a difference between a reference image Y representing a fixed background image and a latest input image Xi, and judging a region at which the obtained difference is greater than or equal to a prescribed threshold as the moving object in motion. In this method, the moving object can be extracted easily under a circumstance in which the background image does not change, but when there is an illumination change, the reference background image also changes accordingly such that the difference obtained in the above procedure can be significantly large for the background portion as well and it becomes impossible to extract the moving object stably.

For this reason, it is indispensable for the moving object extraction based on background subtraction to incorporate the appropriate updating of the background image in correspondence to the change of the background values. Namely, it is necessary to sequentially carry out the moving object extraction with respect to the input image Xi along with the judgement of the change in the background values and the updating of the background image to an appropriate new background image Yi+1 for the moving object extraction for the next input image Xi+1 whenever the background has changed.

FIG. 2 shows a flow chart for the operation in such a moving object extraction based on background subtraction incorporating the background updating. First, a target image input processing 811 enters the frame images sequentially. Then, a background change judgement processing 812 checks whether there is a change in the background values for the input image Xi, and whenever there is a change, a background image correction processing 813 updates the background image accordingly. Then, a background subtraction processing 814 obtains the difference data between the input image Xi and the updated background image, and a binarization processing 815 binarizes the obtained difference data by using a prescribed threshold, so as to output a moving object output 816 representing a region in the input image Xi specified by the result of the binarization processing 815 as the moving object.

In the above procedure, the conventionally used schemes for updating the background image at the background image correction processing 813 include a scheme for using a weighted sum of the input image values and the stored background image values, and a scheme for using a straightforward mean of the frame image values for immediately previous several frames. However, in these schemes, the change in the background values is judged without distinguishing a change due to a passing of the moving object and a change due to the illumination change, so that there has been a problem that the background image can be updated erroneously when many moving objects pass through the input image.

There is also a scheme for extracting the moving object by analyzing image features such as shapes of objects resulting from the background subtraction, but for the input image containing a moving object with a changing shape, it is impossible for this scheme to judge whether the object extraction result reflects the actual moving object or the change in the background values, so that it has been extremely difficult to stably extract the moving object with a changing shape such as a human being.

Thus, a technique for properly updating the background image has not been known conventionally, and the moving object extraction based on background subtraction has not been realized under an environment which incorporates large illumination changes such as an outdoor site.

SUMMARY OF THE INVENTION

It is therefore an object of the present invention to provide a method and an apparatus for moving object extraction based on background subtraction capable of stably extracting the moving object such as a human being or an automobile, equally under an environment which incorporates large illumination changes such as an outdoor site as well as under an environment which incorporates a gradual background change.

According to one aspect of the present invention there is provided a method of moving object extraction based on background subtraction, comprising the steps of: (a) sequentially entering input images containing a moving object region to be extracted; (b) storing temporal changes of image feature parameter values for sub-regions subdividing a frame of each input image entered at the step (a); (c) statistically processing a temporal change of the image feature parameter values for each sub-region within a prescribed target region of the frame stored at the step (b) over a prescribed period of time to to obtain at least one statistical quantity characterizing said temporal change, judging whether said temporal change is due to an illumination change or not according to said statistical quantity and a prescribed illumination change judging condition, and updating a background image value for said each sub-region by a new background image value according to the image feature parameter values for said each sub-region during the prescribed period of time $t_0$, so as to obtain a reconstructed background image; (d) applying a subtraction processing to one of the input images entered at the step (a) and the reconstructed background image obtained at the step (c) to obtain a subtraction image; and (e) applying a binarization processing to the subtraction image obtained at the step (d) to extract the moving object region from the input images entered at the step (a).

According to another aspect of the present invention there is provided an apparatus for moving object extraction based on background subtraction, comprising: input means for sequentially entering input images containing a moving object region to be extracted; storage means for storing temporal changes of image feature parameter values for sub-regions subdividing a frame of each input image entered by the input means; background update means for statistically processing a temporal change of the image feature parameter values for each sub-region within a prescribed target region of the frame stored by the storage means over a prescribed period of time to to obtain at least one statistical quantity characterizing said temporal change, judging whether said temporal change is due to an illumination change or not according to said statistical quantity and a prescribed illumination change judging condition, and updating a background image value for said each sub-region by a new background image value according to the image feature parameter values for said each sub-region during the prescribed period of time $t_0$, so as to obtain a reconstructed background image; subtraction means for applying a subtraction processing to one of the input images entered by the input means and the reconstructed background image obtained by the background update means to obtain a subtraction image; and binarization means for applying a binarization processing to the subtraction image obtained by the subtraction means to extract the moving object region from the input images entered by the input means.

Other features and advantages of the present invention will become apparent from the following description taken in conjunction with the accompanying drawings.

DETAILED DESCRIPTION OF THE PREFERRED EMBODIMENTS

Figure 1:
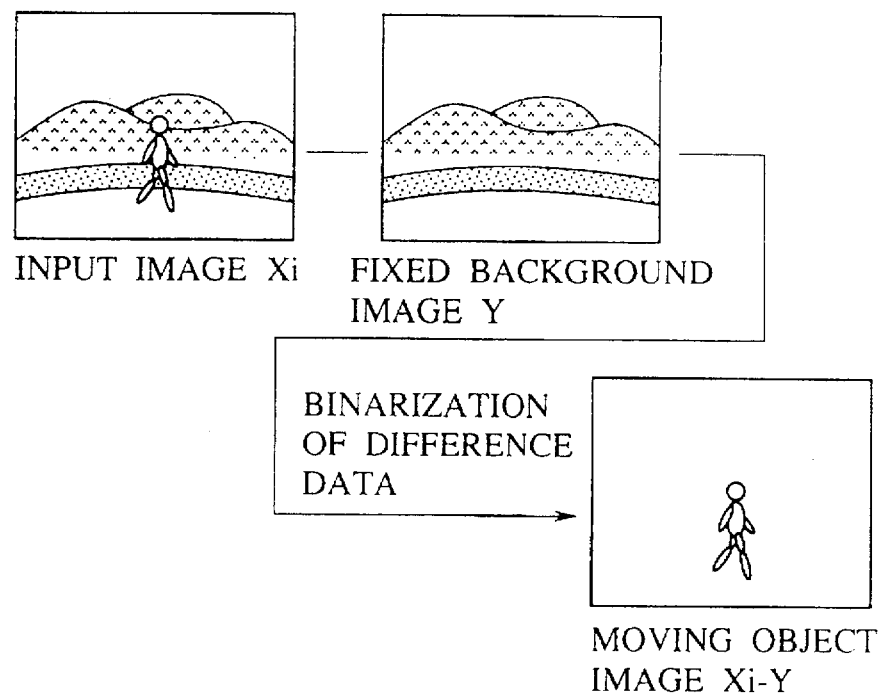
FIG. 1 is a schematic diagram indicating an outline of a conventional method of moving object extraction based on background subtraction.
Figure 2:
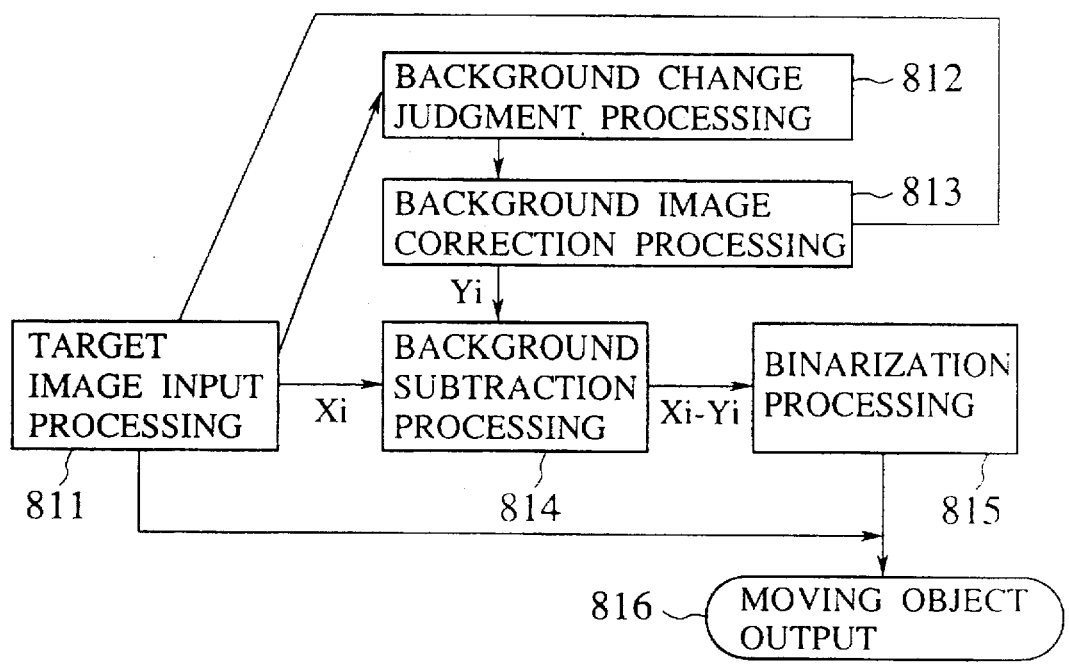
FIG. 2 is a flow chart for the operation in a conventional method of moving object extraction based on background subtraction.
Figure 3:
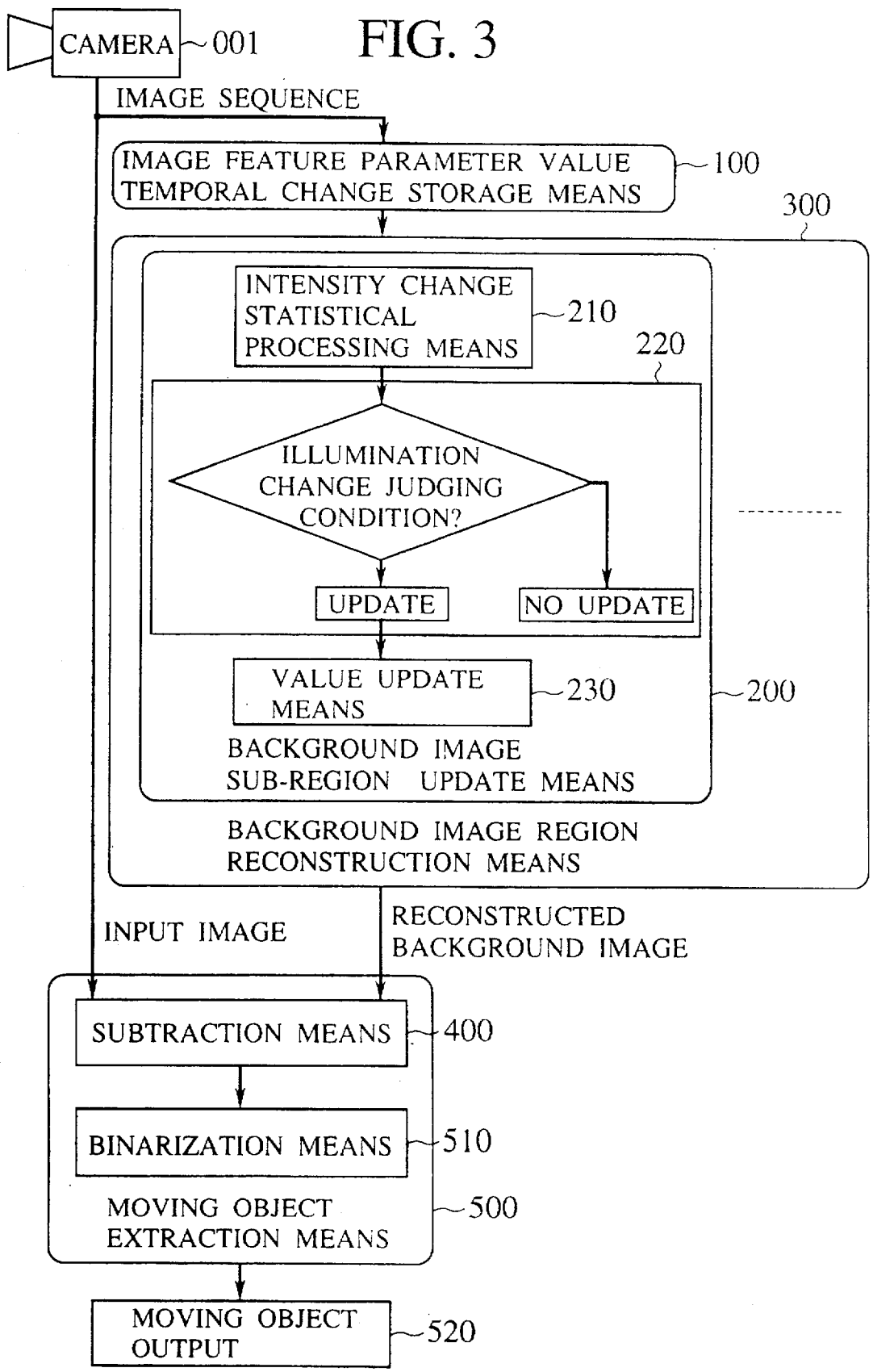
FIG. 3 is a block diagram showing a system configuration of a moving object extraction system in the first embodiment of the present invention.
Figure 4:
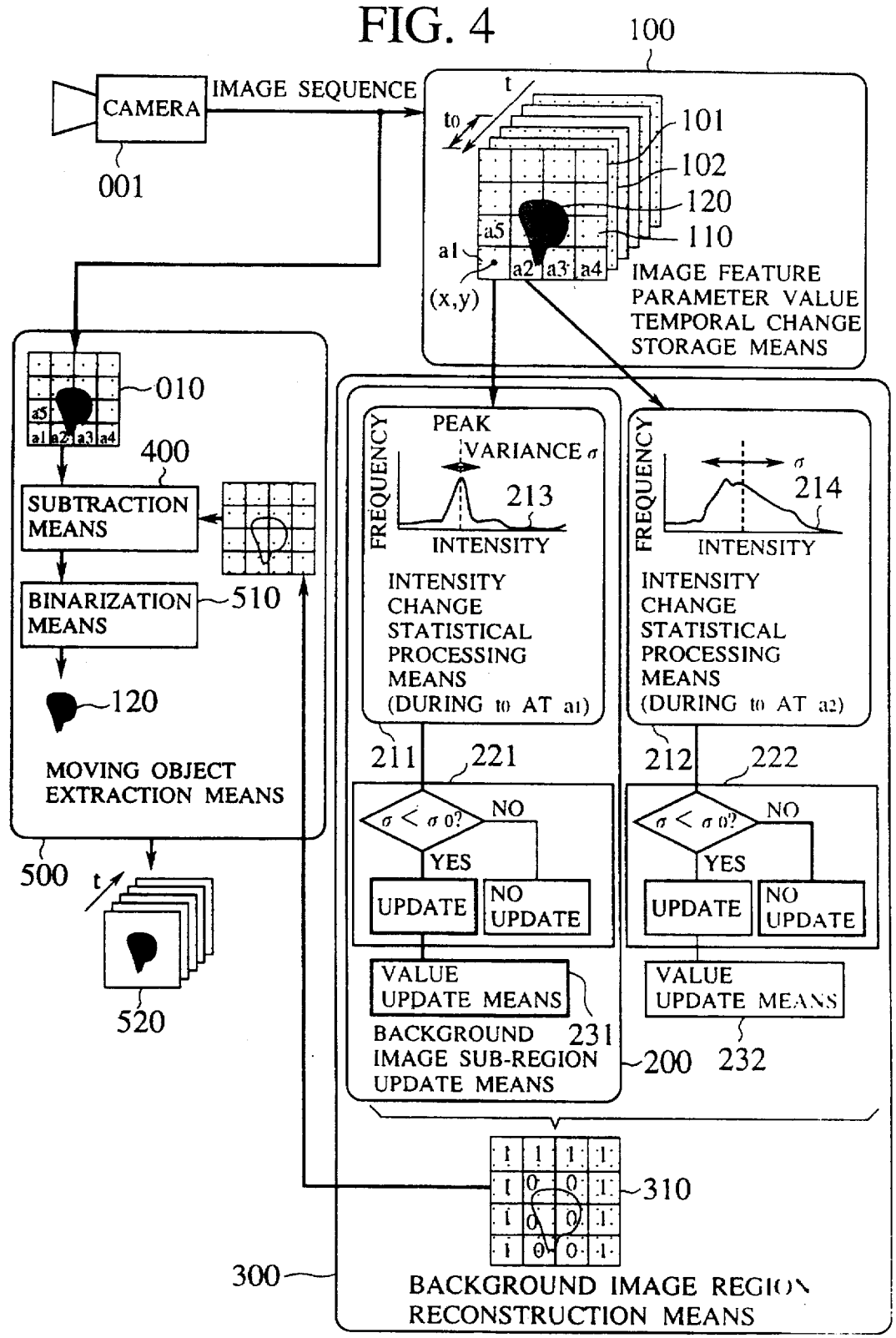
FIG. 4 is a block diagram showing a detailed functional configuration of the moving object extraction system of FIG. 3.

Referring now to FIGS. 3 and 4, the first embodiment of the moving object extraction based on background subtraction according to the present invention will be described in detail.

FIG. 3 shows a system configuration of a moving object extraction system in this first embodiment, while FIG. 4 shows a detailed functional configuration of the moving object extraction system of FIG. 3.

In FIGS. 3 and 4, the system generally comprises: a camera 001 for entering an image sequence of the input images; an image feature parameter value temporal change storage means 100 including a plurality of frame image memories 101, 102, etc. for storing image feature parameter values for the sequentially entered input images; a background image region reconstruction means 300 for reconstructing the background image according to the temporal change of the stored image feature parameter values; and a moving object extraction means 500 for obtaining a moving object output 520 representing the moving object from the entered input image and the reconstructed background image.

In further detail, each frame image memory in the image feature parameter value temporal change storage means 100 stores the image feature parameter values for each input image containing a background region 110 and a moving object region 120 which is divided into a plurality of sub-regions $a_k$ such as pixels located at coordinate positions (x, y) within each frame. In this first embodiment, an intensity at each pixel is used as an exemplary image feature parameter at each sub-region $a_k$.

The background image region reconstruction means 300 further comprises a plurality of background image sub-region update means 200 provided in correspondence to a plurality of sub-regions $a_k$ for updating the image feature parameter value of each sub-region $a_k$, and each background image sub-region update means 200 further includes an intensity change statistical processing means 210 (211, 212 in FIG. 4 for sub-regions $a_1$, $a_2$) for statistically processing the temporal change of the intensity at each sub-region during a prescribed period of time $t_0$, an illumination change judging condition judgement means 220 (221, 222 in FIG. 4 for sub-regions $a_1$, $a_2$) for judging a need for updating the image feature parameter value at each sub-region due to an occurrence of the illumination change according to the statistically processed temporal change of the intensity at each sub-region, and a value update means 230 (231, 232 in FIG. 4 for sub-regions $a_1$, $a_2$) for updating the image feature parameter value at each sub-region according to the judgment result of the illumination change judging condition judgement means 220, so as to obtain a reconstructed new background image 310 collectively. In FIG. 4, a sub-region with a value "1" in the reconstructed background image 310 represents the updated sub-region while a sub-region with a value "0" in the reconstructed background image 310 represents the unchanged (not updated) sub-region.

In this first embodiment, the intensity change statistical processing means 211 (212) obtains a histogram 213 (214) of occurrences of intensity values at a pixel $a_1$ ($a_2$) and detect a peak and a variance $\sigma$ in the histogram 213 (214) as the statistical feature parameter, while the illumination change judging condition judgment means 221 (222) makes the judgment by comparing the detected variance $\sigma$ with a predetermined variance $\sigma_0$ indicating a threshold for separating a case due to the illumination change from a case due to the passing of the moving object.

The moving object extraction means 500 further comprises a subtraction means 400 for subtracting the reconstructed background image obtained by the background image region reconstruction means 300 from the input image entered from the camera 001 in units of pixels, and a binarization means 510 for applying a binarization using a prescribed threshold to a result of the subtraction obtained by the subtraction means 400, and outputting the moving object output 520.

Now, this moving object extraction system of FIGS. 3 and 4 operates as follows.

First, the monochromatic image sequence of the input images are entered from the camera 001, and stored into the frame image memories 101, 102, etc. in the image feature parameter value temporal change storage means 100, where each input image contains a sub-region $a_k$ centered around a coordinate position (x, y). This sub-region $a_k$ may be a region comprising a plurality of pixels, but it is assumed to be a single pixel for the sake of simplicity in this first embodiment. Also, the image feature parameter at each sub-region is the intensity at each pixel given by 8 bit intensity value in this first embodiment. As a result, in the image feature parameter value temporal change storage means 100, for each sub-region $a_k$, as many intensity values as a number of frames entered can be stored during the prescribed period of time $t_0$.

Then, the intensity change statistical processing means 211 obtains the histogram 213 of occurrences of intensity values for the sub-region $a_1$ as shown in FIG. 4 by taking intensity values on a horizontal axis and a frequency of occurrences on a vertical axis. In the example shown in FIG. 4, this sub-region $a_1$ remains as a part of the background as it does not contain the moving object during the period of time $t_0$. The intensity of the background mainly changes due to the illumination change, but when the period of time $t_0$ is as short as several seconds, the illumination change during such a short period of time is generally small, so that the distribution of the intensity values in the histogram 213 takes a bell shape with a small variance $\sigma$ around the peak.

On the other hand, the intensity change statistical processing means 212 obtains the histogram 214 of occurrences of intensity values for the sub-region $a_2$ as shown in FIG. 4, and this sub-region $a_2$ contains the moving object so that the intensity values largely change during the period of time $t_0$ and the distribution of the intensity values in the histogram 214 takes a spread shape with a large variance $\sigma$ around the peak.

Then, each of the illumination change judging condition judgment means 221 and 222 compares the variance $\sigma$ obtained by the respective one of the intensity change statistical processing means 211 and 212 with the predetermined variance $\sigma_0$ indicating a threshold for separating a case due to the illumination change from a case due to the passing of the moving object. When the obtained variance $\sigma$ is less than the predetermined variance $\sigma_0$, the change of the intensity value at the respective sub-region is judged as due to the illumination change, in which case it is decided that the intensity value at the respective sub-region is to be updated. On the other hand, when the obtained variance $\sigma$ is greater than or equal to the predetermined variance $\sigma_0$, the change of the intensity value at the respective sub-region is judged as due to the cause other than the illumination change, such as the passing of the moving object, in which case it is decided that the intensity value at the respective sub-region is not to be updated.

Then, the value update means 231 and 232 update the intensity of the sub-regions $a_1$ and $a_2$ whenever necessary. In this manner, the reconstructed background image 310 is obtained by the background image sub-region update means 200 in units of sub-regions. This operation for updating the background image sub-region may be carried out over the entire frame of each input image, or within a desired region of each input image.

Here, instead of using the predetermined variance $\sigma_0$ as the illumination change judging condition as described above, it is also possible to use a predetermined feature in the distribution shape of the histogram for a case of the illumination change as the illumination change judging condition such that a case of the illumination change can be judged by comparing a feature in the distribution shape of the obtained histogram with the predetermined feature.

It is also noted that the manner of updating the background image as described above is also applicable to a case other than the above described case of the pixel value change due to the illumination change. Namely, it is applicable to a case of gradually changing background object, or any other case which is clearly distinguishable from the change due to the passing of the moving object. For example, in a case of automatically monitoring movements of persons in an office, positions of papers on desks can change irregularly, in clear distinction from the movements of the persons. That is, the papers move discontinuously as they remain unchanged after they are moved once until they are moved again, whereas the movements of the persons are generally continuous during the period of time $t_0$. Consequently, by means of a comparison of the histogram, it is possible to distinguish the intensity change due to the moving object, i.e., the movement of the person, from the others such as that due to the change of the positions of the papers. Therefore, the manner of updating the background image similar to that described above can be applied to such a case in a similar manner.

The reconstructed background image 310 obtained in this manner can be considered as reflecting the most reliable state of the background immediately before the moving object appears. Thus, by utilizing the sequentially reconstructed background image at the moving object extraction means 500, in applying the subtraction processing and the binarization processing to the desired region in the input images by the subtraction means 400 and the binarization means 510, it is possible to extract the moving object region 120, and by sequentially repeating this operation with respect to the sequentially entered input images, it is possible to obtain the moving object output 520 representing sequential images of the moving object as shown in FIG. 4.

It is to be noted that the use of the monochromatic camera and the intensity value at each pixel as the image feature parameter value as described above is only an example, and it is possible to modify the above described first embodiment to use the other image feature parameter such as image concentration data obtained by a monochromatic camera, or data that can be extracted from color data obtained by a color camera such as the intensity, the hue, the saturation, the intensity gradient with respect to neighboring pixels, and other quantities expressed in the chromaticness scale system. It is also possible to use concentration data or temperature data obtained by an infrared camera, distance data obtained by a range sensor, or reflection intensity data obtained by an ultrasonic sensor as the image feature parameter.

It is also to be noted that the sub-region may not necessarily be a single pixel as described above, and may be a block image formed by a plurality of pixels, in which case, the image feature parameter can be a value obtained by statistically processing a plurality of intensity values or other quantities qualifying as the image feature parameter, such as the mean value, the most frequent value, the maximum value, or the minimum value of the intensity values within the block image.

In a case the mean value of the intensity values within the block image as the image feature parameter for instance, the operation up to the illumination change judging condition judgment means 221 and 222 are similar as described above, and the updating of the value at each sub-region in a case it is judged as a case of the illumination change can be carried out as follows. Namely, the block image corresponding to the intensity value at the peak of the histogram of occurrences of intensity values for this sub-region is selected from the frame images for the past period of time $t_0$ stored in the image feature parameter value temporal change storage means 100, and the background value of this sub-region is replaced by the selected block image in the reconstructed background image 310. When this operation is carried out over the desired region, the reconstructed background image 310 can be obtained sequentially as described above. The operation at the moving object extraction means 500 is similar as described above.

Referring now to FIGS. 5A to 5D, the second embodiment of the moving object extraction based on background subtraction according to the present invention will be described in detail.

Figure 5A:
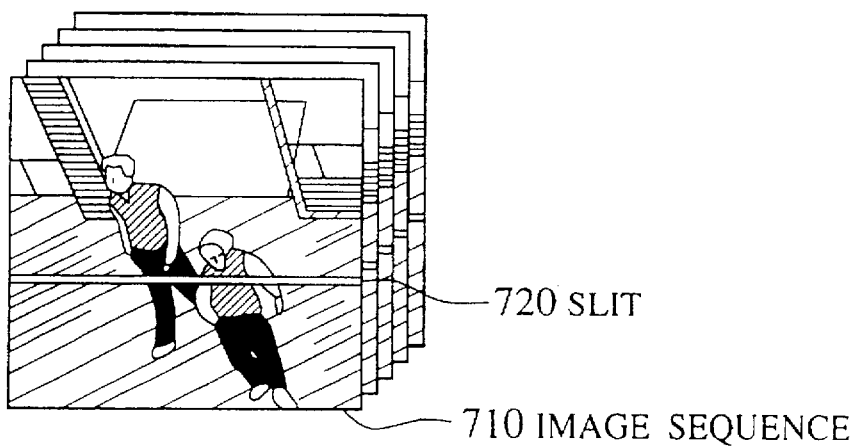
FIG. 5A is an illustration of an exemplary input image with a slit used in a moving object extraction system in the second embodiment of the present invention.

In the first embodiment of FIGS. 3 and 4 described above, the desired region for applying the operation for updating the background value has been assumed as the entire image frame, but in this second embodiment, this desired region is set to be a single line within an image frame, i.e., a sampling slit 720 in a form of a slit shaped pixel sequence within an image sequence 710 as shown in FIG. 5A.

Figure 5B:
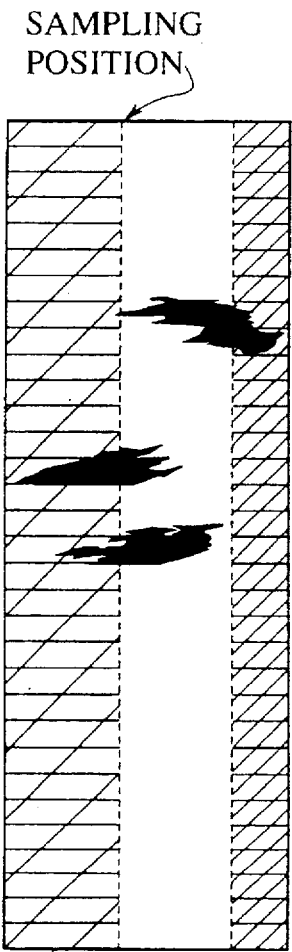
FIG. 5B is an illustration of an exemplary space-time image obtained from the input image of FIG. 5A.
Figure 5C:
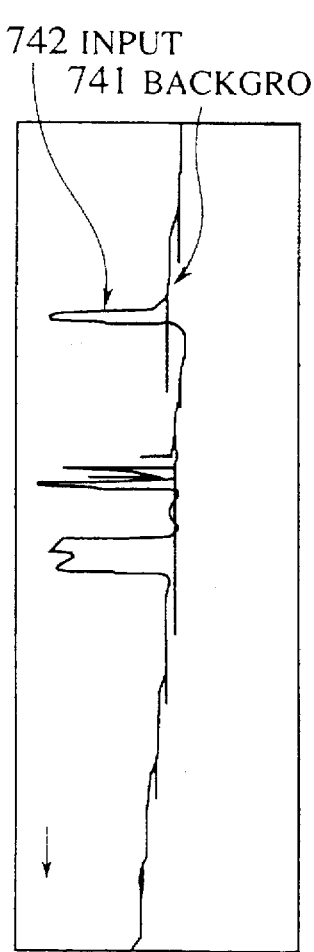
FIG. 5C is an illustration of an exemplary graph indicating temporal change of input value and background value obtained from the space-time image of FIG. 5B.
Figure 5D:
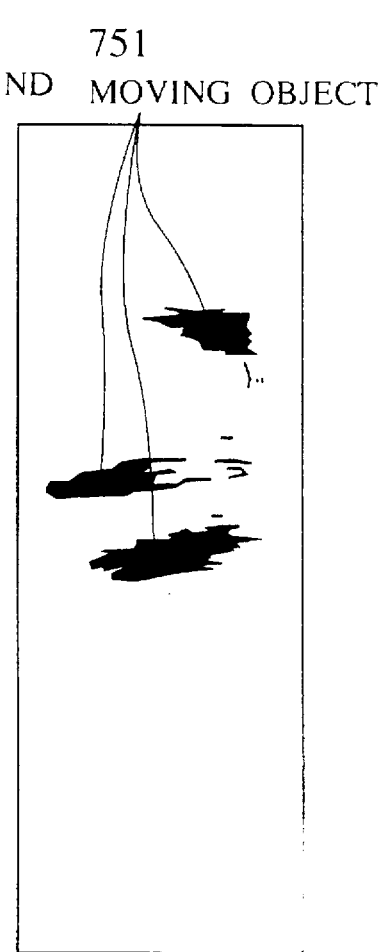
FIG. 5D is an illustration of an exemplary space-time image indicating the extraction result obtained from the space-time image of FIG. 5B.

FIG. 5B shows a space-time image 730 formed by the slit 720 in the image sequence 710 of FIG. 5A and a time axis, while FIG. 5C shows a graph 740 indicating the temporal change of the input value 742 and the background value 741 at a specific sampling position in the space-time image of FIG. 5B, and FIG. 5D shows a space-time image 750 indicating the extraction result of the moving object 751.

In this second embodiment, the sub-region is set to be a pixel in the image, and the desired region for applying the updating of the background value is set to be a single line of the sampling slit 720. By setting the desired region in this manner, the space-time image 730 formed by the slit 720 and the time axis can be produced easily at high speed. Here, the image sequence 710 to be entered may not necessarily be a two dimensional image as shown in FIG. 5A, and can be a one dimensional slit image directly obtained by a range sensor or a line camera.

Then, by applying the moving object extraction based on background subtraction as in the first embodiment described above for the moving object within the slit shaped space-time image, it is possible to extract only the moving object 751 at very high speed, regardless of the illumination change.

More specifically, the operation in this second embodiment proceeds as follows.

First, as shown in FIG. 5A, the slit 720 is provided over the image sequence 710 containing passing persons which incorporates the illumination changes, and the obtained slit images are arranged along the time axis to obtain the space-time image 730 shown in FIG. 5B. Then, as shown in FIG. 5C for a particular pixel, the appropriate background value 741 can be sequentially judging in accordance with the illumination changes, without being influenced by the change of the input value 742 due to the passing of the persons, by means of the proper updating of the background value as in the first embodiment described above. Then, by using the properly reconstructed background image, the space-time image 750 with only the moving object 751 extracted as shown in FIG. 5D can be obtained stably at high speed, by means of the moving object extraction based on background subtraction as in the first embodiment described above.

Next, the third embodiment of the moving object extraction based on background subtraction according to the present invention will be described in detail.

In the first embodiment described above, the variance $\sigma$ is compared with the predetermined variance $\sigma_0$ in judging the illumination change, but in this third embodiment, either as a replacement of this or as a supplement of this, the following scheme is adopted. Namely, in general, the change of the background image due to the causes other than the passing of the moving object such as the illumination change and the gradually changing background object takes place gradually, and the shapes of the histograms for such cases resemble each other. Consequently, in this third embodiment, in judging the need for the updating at each sub-region $a_i$, the shape of the histogram for each sub-region $a_i$ is compared with the shapes of the histograms for the other sub-regions in vicinity of that sub-region $a_i$, and it is decided that the updating is necessary for that sub-region $a_i$ when the similar histogram shapes are dominant in vicinity of that sub-region $a_i$.

For example, in a case depicted in FIG. 4, the histogram shapes for the sub-regions $a_1$, $a_4$, and as will be similar to each other, so that the intensity changes in these sub-regions will be judged as those due to the illumination changes and therefore the background values at these sub-regions will be updated, whereas the histogram shapes for the sub-regions $a_2$ and $a_3$ will be largely different from the others, so that the intensity changes in these sub-regions will be judged as those due to the passing of the moving object and therefore the background values at these sub-regions will not be updated.

Next, with reference to FIGS. 6 and 7, the fourth embodiment of the moving object extraction based on background subtraction according to the present invention will be described in detail.

Figure 6:
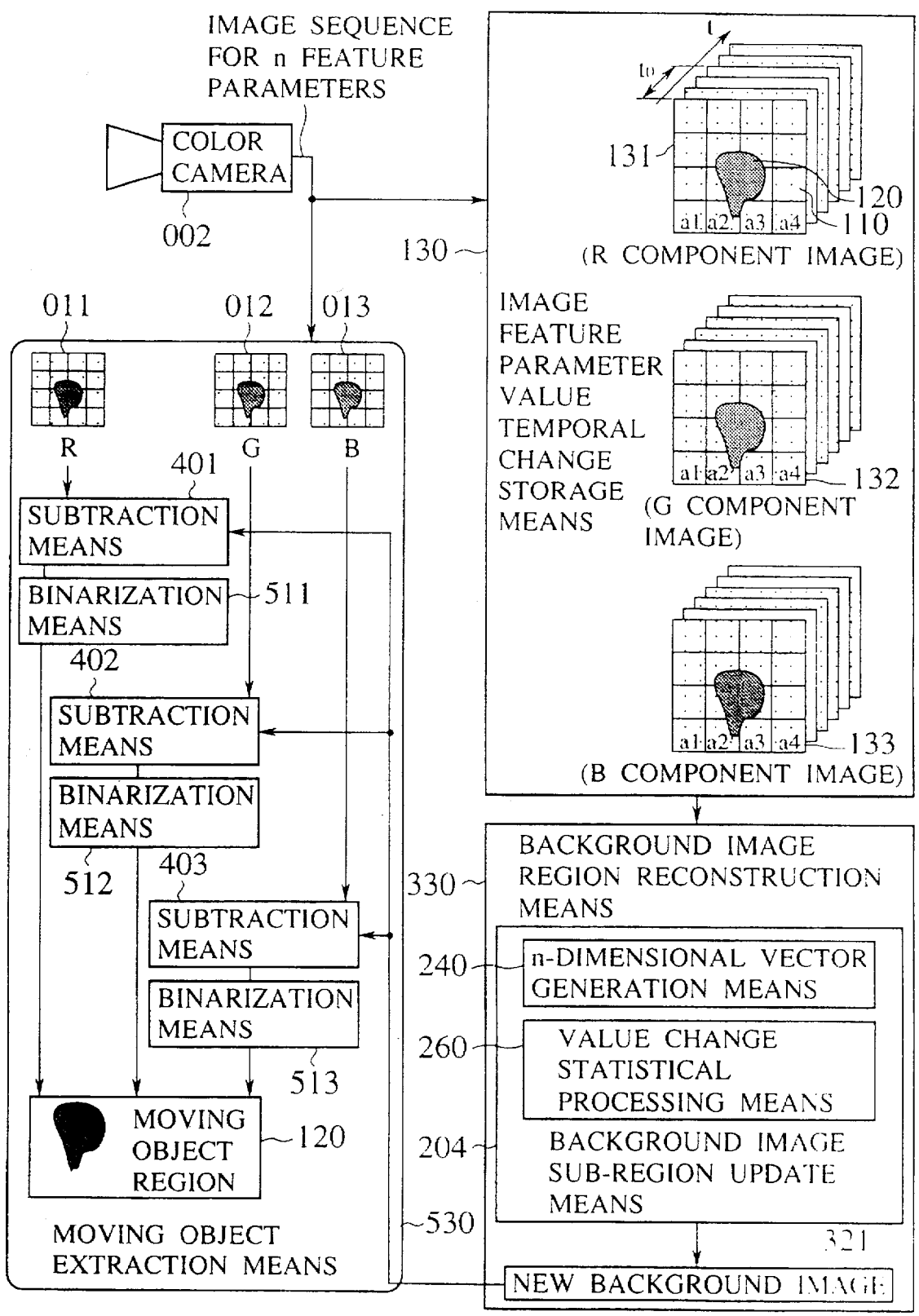
FIG. 6 is a block diagram showing a system configuration of a moving object extraction system in the fourth embodiment of the present invention.
Figure 7:
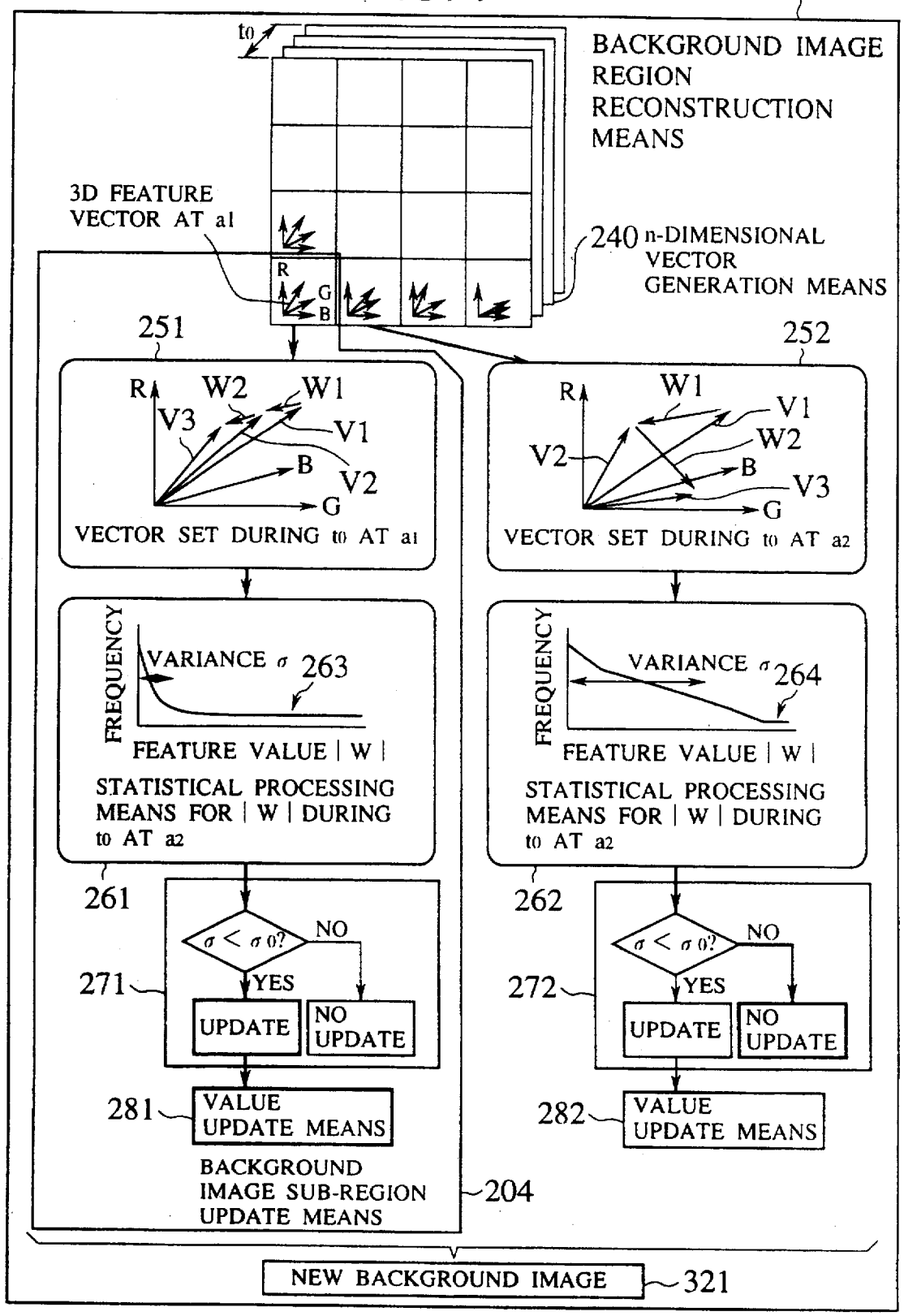
FIG. 7 is a block diagram showing a detailed functional configuration of a background image region reconstruction means in the moving object extraction system of FIG. 6.

FIG. 6 shows a system configuration of a moving object extraction system in this fourth embodiment, while FIG. 7 shows a detailed functional configuration of the background image region reconstruction means 330 in the moving object extraction system of FIG. 6.

In FIGS. 6 and 7, the system generally comprises: a color camera 002 for entering an image sequence of the color input images; an image feature parameter value temporal change storage means 130 including three sets of frame image memories 131, 132, and 133 for storing image feature parameter values for R, G, and B images in the sequentially entered color input images; a background image region reconstruction means 330 for reconstructing the background image according to the temporal change of the stored image feature parameter values; and a moving object extraction means 530 for obtaining a moving object region 120 from the entered input image and the reconstructed background image.

In further detail, each frame image memory in the image feature parameter value temporal change storage means 130 stores the image feature parameter values for each input image containing a background region 110 and a moving object region 120 which is divided into a plurality of sub-regions $a_k$ such as pixels located at coordinate positions (x, y) within each frame.

The background image region reconstruction means 330 further comprises a plurality of background image sub-region update means 204 provided in correspondence to a plurality of sub-regions $a_k$ for updating the image feature parameter value of each sub-region $a_k$, and each background image sub-region update means 204 further includes an n-dimensional vector generation means 240 (n=3 in this fourth embodiment) for generating n-dimensional feature vectors from the image feature parameter values at each sub-region for R, G, and B images, and a value change statistical processing means 260 for statistically processing the temporal change of the image feature parameter values at each sub-region during a prescribed period of time $t_0$.

As shown in FIG. 7, the background image sub-region update means 204 receives a vector set 251 (252) during the period of time $t_0$ at the respective sub-region $a_1$ ($a_2$), and includes a statistical processing means 261 (262) for statistically processing distances W among the feature vectors in the vector set 251 (252), an illumination change judging condition judgement means 271 (272) for judging a need for updating the image feature parameter value at each sub-region due to an occurrence of the illumination change according to the statistical processing result at each sub-region, and a value update means 281 (282) for updating the image feature parameter value at each sub-region according to the judgment result of the illumination change judging condition judgement means 271 (272), so as to obtain a reconstructed new background image 321 collectively.

The moving object extraction means 530 further comprises subtraction means 401, 402, and 403 for subtracting the R, G, and B images in the reconstructed background image obtained by the background image region reconstruction means 330 from the R, G, and B images 011, 012, and 013 in the color input image entered from the color camera 002 in units of pixels, and a binarization means 511, 512, and 513 for applying a binarization using a prescribed threshold to the subtraction results for the R, G, and B images, respectively.

Now, this moving object extraction system of FIGS. 6 and 7 operates as follows.

First the color image sequence of the input images are entered from the color camera 002, and the R, G, and B images (pixel values) are stored into the frame image memories 131, 132, and 133 as the image feature parameters. Then, as indicated in FIG. 7, three types of the pixel values for R, G, and B for each sub-region are given as a feature vector in a three-dimensional feature space for each sub-region at the n-dimensional vector generation means 240. The similar feature vectors are also plotted during the period of time $t_0$ for each sub-region, so as to obtain the vector set during $t_0$ for each sub-region $a_k$, such as the vector set 251 (252) for the sub-region $a_1$ ($a_2$).

Here, the vector set 251 (252) has the following feature. Namely, at the sub-region $a_1$ in which the moving object is absent, the feature vectors V1, V2, and V3 change only gradually over the period of time $t_0$, and the distance W1 between the feature vectors V1 and V2 as well as the distance W2 between the feature vectors V2 and V3 have small values. On the other hand, at the sub-region $a_2$ in which the moving object is present, the feature vectors V1, V2, and V3 change largely over the period of time $t_0$, and the distance W1 between the feature vectors V1 and V2 as well as the distance W2 between the feature vectors V2 and V3 have large values.

Then, by using these distances W1 and W2 as the feature value |W|, the statistical processing means 261 (262) obtains the histogram 263 (264) of occurrences of feature values for the sub-region $a_1$ ($a_2$) as shown in FIG. 7 by taking the feature values on a horizontal axis and a frequency of occurrences on a vertical axis. As a result, the histogram 263 for the sub-region $a_1$ has a distribution with a small variance σ, whereas the histogram 264 for the sub-region $a_2$ has a distribution with a large variance σ.

Consequently, the illumination change judging condition judgment means 271 (272) compares the variance σ obtained by the respective statistical processing means 261 (262) with the predetermined variance $σ_0$ indicating a threshold for separating a case due to the illumination change or a case due to the gradually changing background object from a case due to the passing of the moving object.

When the obtained variance σ is less than the predetermined variance $σ_0$, the change of the intensity value at the respective sub-region is judged as due to the illumination change or the gradually changing background object, in which case it is decided that the intensity value at the respective sub-region is to be updated. On the other hand, when the obtained variance σ is greater than or equal to the predetermined variance $σ_0$, the change of the intensity value at the respective sub-region is judged as due to the cause other than the illumination change or the gradually changing background object, such as the passing of the moving object, in which case it is decided that the intensity value at the respective sub-region is not to be updated.

Then, the value update means 281 (282) updates the intensity of the sub-region al ($a_2$) whenever necessary. In this manner, the reconstructed new background image 321 is obtained by the background image sub-region update means 204 in units of sub-regions. Here, the reconstructed new background image 321 contains R, G, and B images which are to be subjected to the subtraction processing and the binarization processing at the moving object extraction means 530 in conjunction with the R, G, B images in the color input image, so as to extract the moving object region 120.

In this fourth embodiment, a plurality (three) of image feature parameters (pixel values for R, G, and B) are utilized in updating the background values and extracting the moving object, so that the judgment for a need to update the background value at each sub-region can be made accurately, and the moving object can be extracted stably.

It is to be noted that, instead of using the R, G, and B images obtained by the color camera as the image feature parameter values as described above, it is possible to modify the above described fourth embodiment to use the other image feature parameters that can be extracted from color data obtained by a color camera such as any combination of the intensity, the hue, the saturation, the intensity gradient with respect to neighboring pixels, and other quantities expressed in the chromaticness scale system. It is also possible to use any combination of concentration data or temperature data obtained by an infrared camera, distance data obtained by a range sensor, and reflection intensity data obsensed by an ultrasonic sensor as the image feature parameters.

It is also to be noted that the sub-region may not necessarily be a single pixel as described above, and may be a block image formed by a plurality of pixels, in which case, the image feature parameter can be a value obtained by statistically processing a plurality of intensity values or other quantities qualifying as the image feature parameter, such as the mean value, the most frequent value, the maximum value, or the minimum value of the intensity values within the block image.

Next, with reference to FIGS. 8, 9A and 9B, the fifth embodiment of the moving object extraction based on background subtraction according to the present invention will be described in detail.

This fifth embodiment differs from the fourth embodiment described above only in that the the background image sub-region update means 204 in the background image region reconstruction means 330 is replaced by the background image sub-region update means 205 in the background image region reconstruction means 300 so as to obtain the reconstructed new background image 322. FIG. 8 shows a detailed functional configuration of the background image region reconstruction means 331 in this fifth embodiment.

Figure 8:
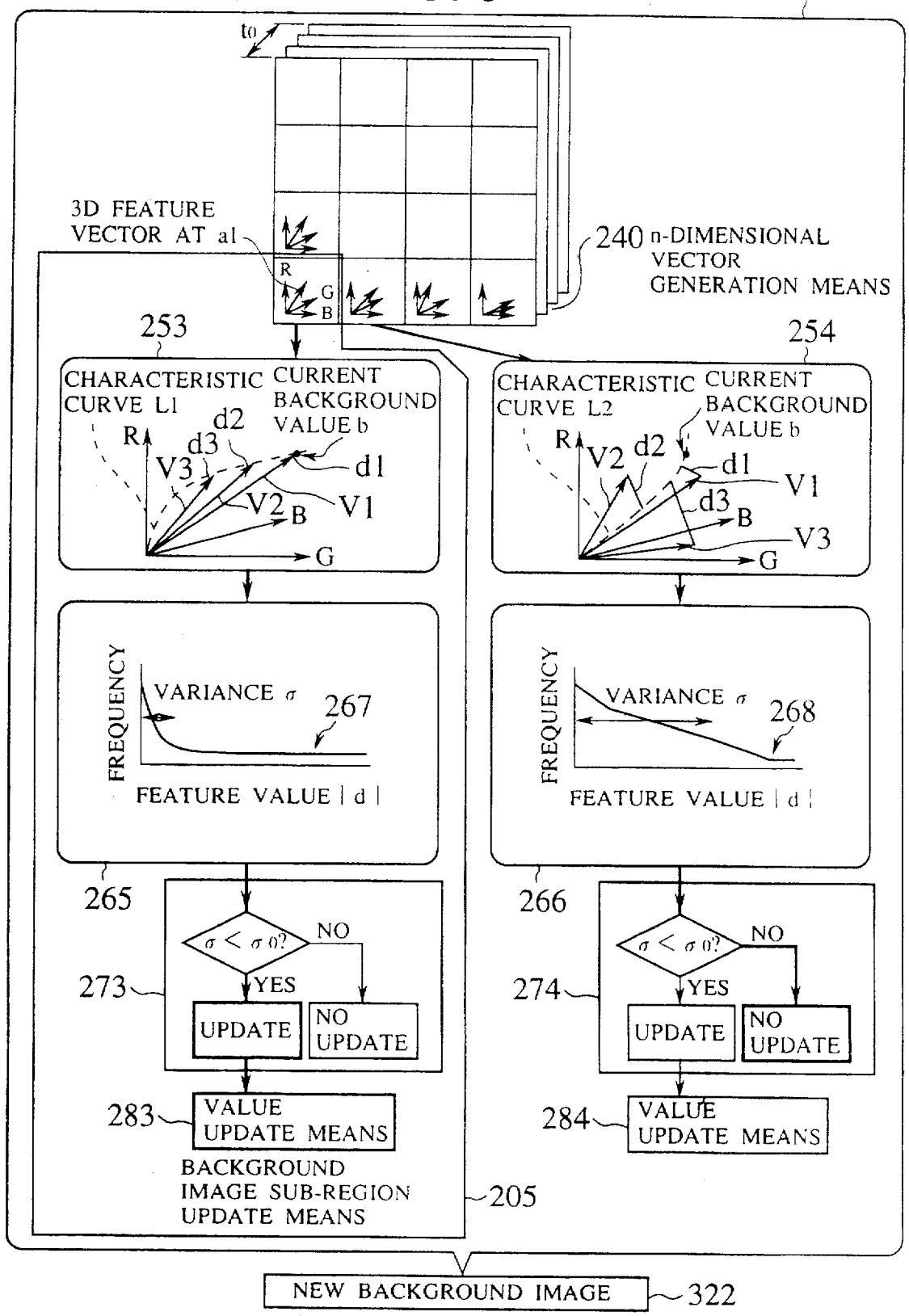
FIG. 8 is a block diagram showing a detailed functional configuration of a background image region reconstruction means in a moving object extraction system in the fifth embodiment of the present invention.
Figure 9A:
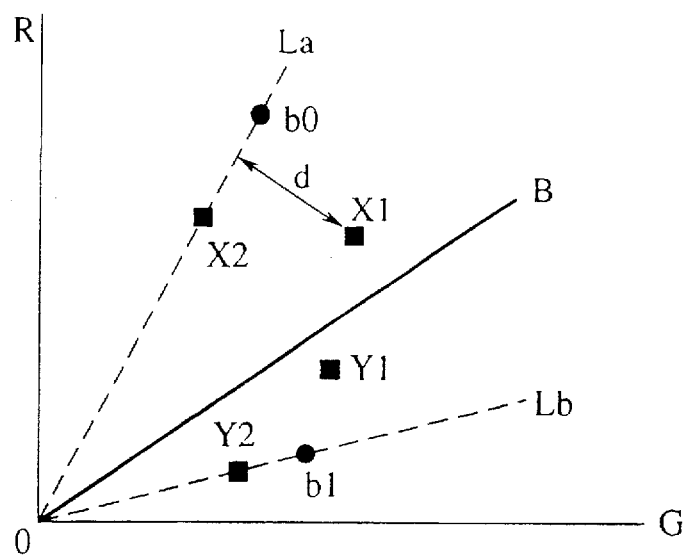
FIGS. 9A and 9B are graphs three-dimensional feature vector space for explaining the operation in a moving object extraction system in the fifth embodiment of the present invention.
Figure 9B:
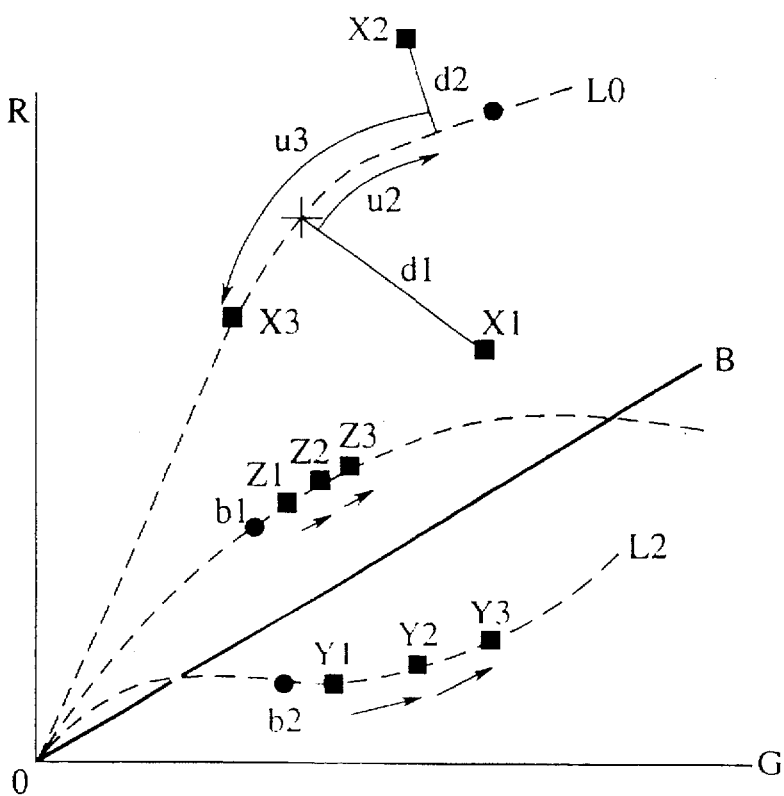

In FIG. 8, the background image region reconstruction means 331 further comprises a plurality of background image sub-region update means 205 provided in correspondence to a plurality of sub-regions $a_k$ for updating the image feature parameter value of each sub-region $a_k$, and each background image sub-region update means 205 further includes the n-dimensional dimensional vector generation means 240 similar to that in the fourth embodiment described above, a discrete set calculation means 253 (254) for calculating the discrete set with respect to the imaging system characteristic curve L1 (L2) during the period of time to at the sub-region $a_1$ ($a_2$), a statistical processing means 265 (266) for statistically processing distances d (d1, d2, d3) of the the feature vectors V1, V2, and V3 from the characteristic curve L1 (L2), an illumination change judging condition judgement means 273 (274) for judging a need for updating the image feature parameter value at each sub-region due to an occurrence of the illumination change according to the statistical processing result at each sub-region, and a value update means 283 (284) for updating the image feature parameter value at each sub-region according to the judgment result of the illumination change judging condition judgement means 273 (274), so as to obtain a reconstructed new background image 322 collectively.

Now, the feature values used in this fifth embodiment will be described with reference to FIGS. 9A and 9B, where (X1, X2, X3), (Y1, Y2, Y3), and (Z1, Z2, Z3) are three sets of input values in the respective sub-region, b0, b1, and b2 are three background values in the respective sub-region, La, Lb, L0, L1, and L2 are characteristic curves corresponding to the background values, and u2 and u3 are the motion vectors on the characteristic curve L0.

In this fifth embodiment, the characteristic curve of the three-dimensional vectors which change in conjunction with the illumination change is obtained in advance according to the background values b0, b1, etc. in each sub-region. Here, in order to simplify the processing, the change of the background value due to the illumination change can be assumed to occur along a straight line joining the current background value and the origin such that the characteristic curves can be approximated by the straight lines La and Lb shown in FIG. 9A.

Here, the set of three feature vectors obtained by the discrete set calculation means 253 (254) has the following feature. Namely, at the sub-region $a_1$ in which the moving object is absent, the feature vectors V1, V2, and V3 change only gradually from the characteristic curve L1 over the period of time $t_0$, and the distances d1, d2, and d3 of the feature vectors V1, V2, and V3 from the characteristic curve L1 have small values. On the other hand, at the sub-region $a_2$ in which the moving object is present, the feature vectors V1, V2, and V3 change largely over the period of time $t_0$, and the distances d1, d2, and d3 of the feature vectors V1, V2, and V3 from the characteristic curve L2 have large values.

Then, by using these distances d1, d2, and d3 as the feature value |d|, the statistical processing means 265 (266) obtains the histogram 267 (268) of occurrences of feature values for the sub-region $a_1$ ($a_2$) as shown in FIG. 8 by taking the feature values on a horizontal axis and a frequency of occurrences on a vertical axis. As a result, the histogram 267 for the sub-region $a_1$ has a distribution with a small variance σ, whereas the histogram 268 for the sub-region $a_2$ has a distribution with a large variance σ.

Consequently, the illumination change judging condition judgment means 273 (274) compares the variance σ obtained by the respective statistical processing means 265 (266) with the predetermined variance $σ_0$ indicating a threshold for separating a case due to the illumination change from a case due to the passing of the moving object. When the obtained variance σ is less than the predetermined variance $σ_0$, the change of the intensity value at the respective sub-region is judged as due to the illumination change, in which case it is decided that the intensity value at the respective sub-region is to be updated. On the other hand, when the obtained variance σ is greater than or equal to the predetermined variance $σ_0$, the change of the intensity value at the respective sub-region is judged as due to the cause other than the illumination change, such as the passing of the moving object, in which case it is decided that the intensity value at the respective sub-region is not to be updated.

Then, the value update means 283 (284) updates the intensity of the sub-region $a_1$ ($a_2$) whenever necessary. In this manner, the reconstructed new background image 322 is obtained by the background image sub-region update means 205 in units of sub-regions.

It is possible to modify the above described fifth embodiment to use a mean value of the distances d used as the feature values for the histogram instead of the variance σ of the histogram in evaluating the spread of the feature values in the histogram, for the purpose of judging a case due to the illumination change. In this case, the mean value becomes small for the sub-region a1 whereas the mean value becomes large for the sub-region a2, so that by comparing the mean value of the feature values in the histograms with a predetermined mean value of the feature values for a case due to the illumination change, it becomes possible to judge a case due to the illumination change, for which the background updating is necessary, similarly as in a case of using the variance as described above.

Moreover, it is also possible to judge the level of abruptness of the illumination change by utilizing the motion vector of a projection point on the characteristic curve of the displacement from the characteristic curve (i.e., a point at which a line perpendicular to the characteristic curve and passing through the current background value intersects with the characteristic curve), in addition to the distance d from the characteristic curve, as follows. For example, in FIG. 9B, for the characteristic curves L0, L1, and L2 corresponding to the background values b0, b1, and b2, the change of the feature vectors in each sub-region can be expressed in terms of the distance d from the characteristic curve as well as the motion vector u on the characteristic curve, such that a case of the abrupt illumination change (Y1, Y2, Y3) can be distinguished from a case of the gradual illumination change (Z1, Z2, Z3) according to the motion vectors u, while distinguishing a case of the passing of the moving object (X1, X2, X3) according to the distances d.

Next, with reference to FIGS. 10 and 11, the sixth embodiment of the moving object extraction based on background subtraction according to the present invention will be described in detail.

This sixth embodiment differs from the first embodiment described above only in that the the background image sub-region update means 200 is replaced by the background image sub-region update means 201. FIG. 10 shows a schematic configuration of the background image sub-region update means 201 in this sixth embodiment, while FIG. 11 shows a detailed functional configuration of the background image sub-region update means 201 in this sixth embodiment.

Figure 10:
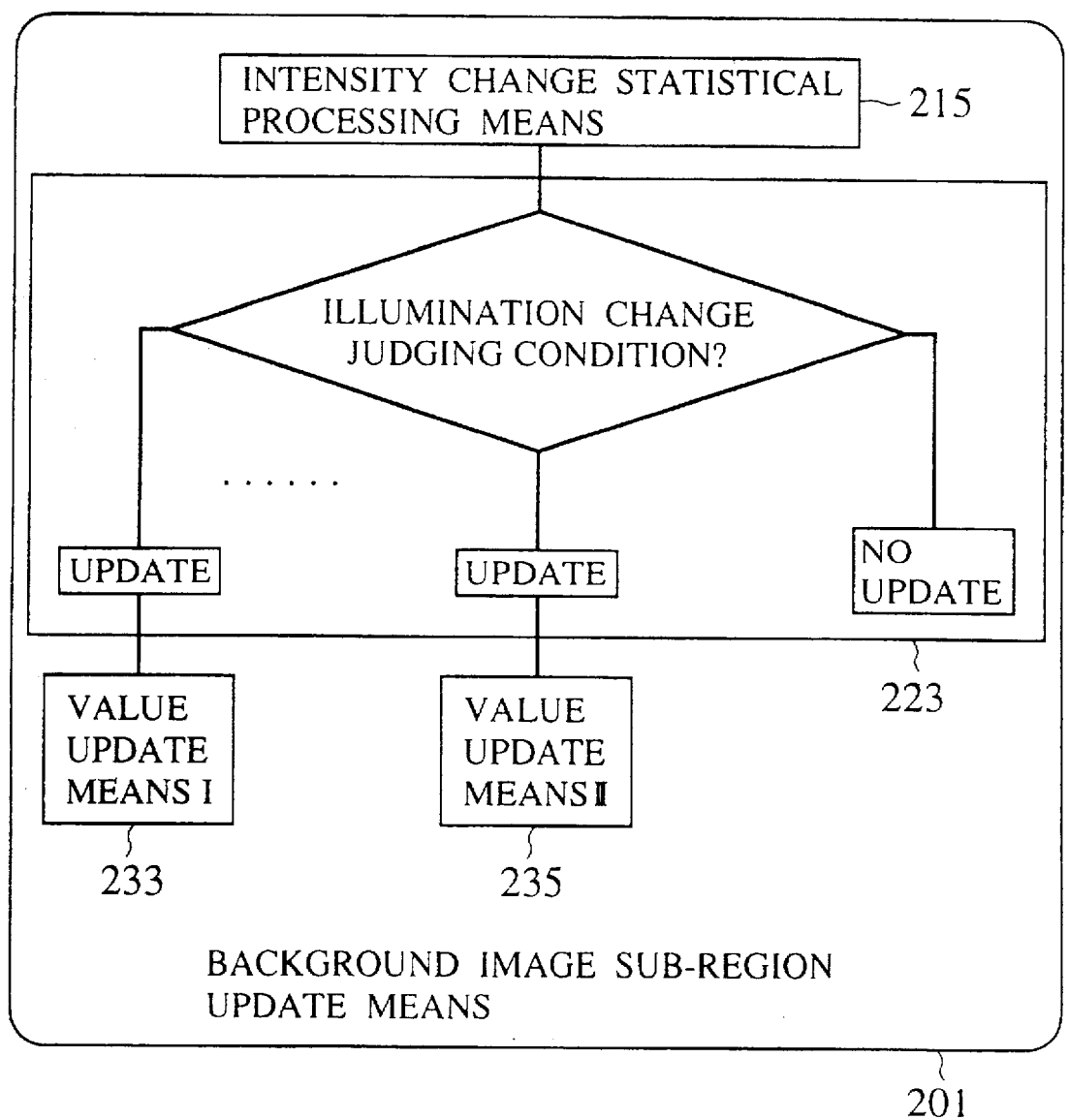
FIG. 10 is a block diagram showing a schematic configuration of a background image sub-region update means in a moving object extraction system in the sixth embodiment of the present invention.

As shown in FIG. 10, this background image sub-region update means 201 generally comprises an intensity change statistical processing means 215 for statistically processing the temporal change of the intensity at each sub-region during a prescribed period of time $t_0$, and an illumination change judging condition judgement means 223 for judging a need for updating the image feature parameter value at each sub-region due to an occurrence of the illumination change according to a plurality of illumination change judging conditions on the statistically processed temporal change of the intensity at each sub-region, and a plurality of value update means 233 to 235 for updating the image feature parameter value at each sub-region according to the judgment result of the illumination change judging condition judgement means 223.

Figure 11:
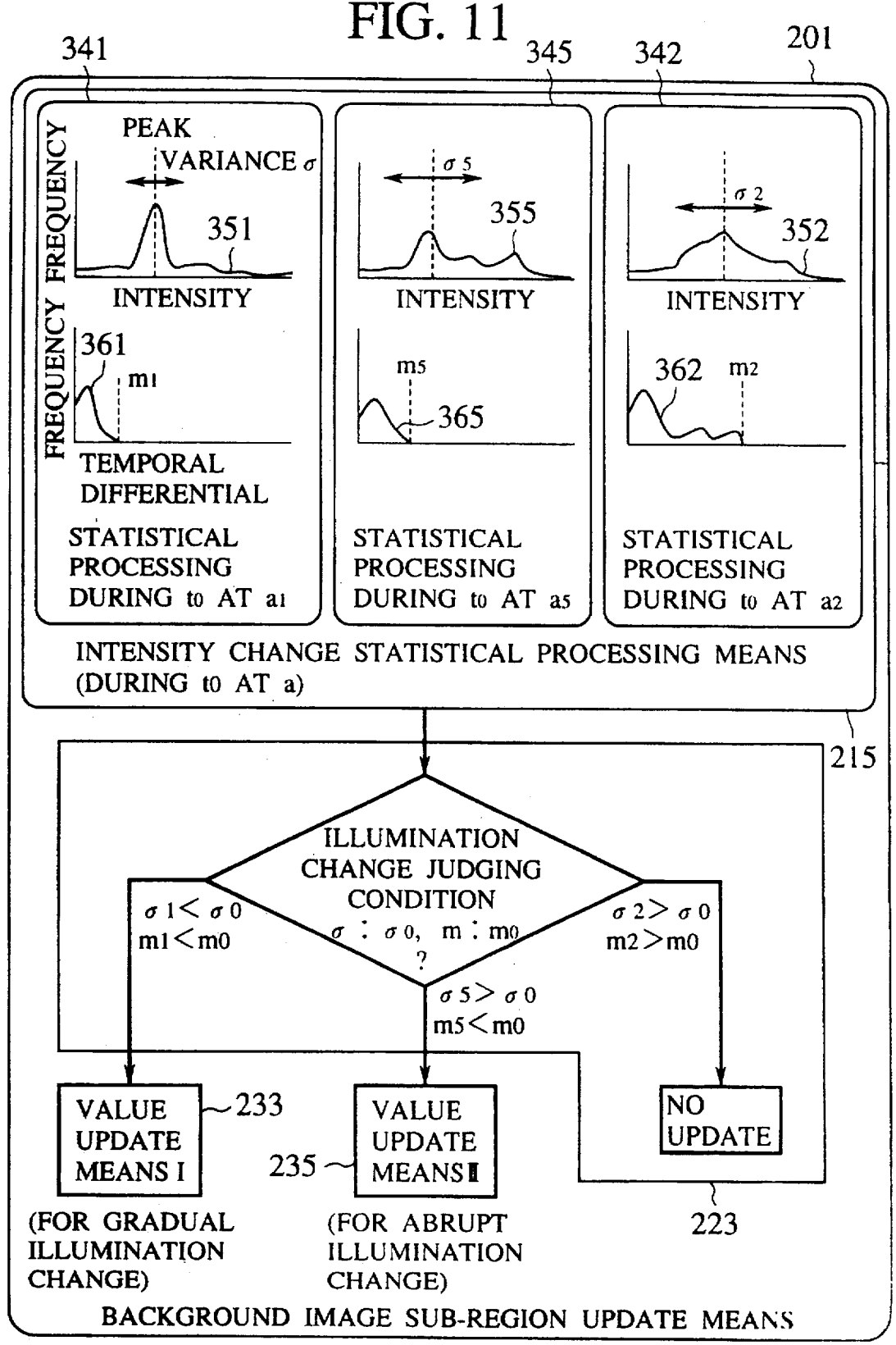
FIG. 11 is a block diagram showing a detailed functional configuration of the background image sub-region update means of FIG. 10.

In further detail, as shown in FIG. 11, the intensity change statistical processing means 215 includes the statistical processing means 341, 342, and 345 for statistically processing the temporal change of the intensity at the respective sub-regions $a_1$, $a_2$, and as during a prescribed period of time $t_0$, by using the histograms 351, 352, and 355 of occurrences of intensity values during the period of time $t_0$ at the respective sub-regions $a_1$, $a_2$, and $a_5$ to obtain the variances $σ_1$, $σ_2$, and $σ_5$ in the respective sub-regions $a_1$, $a_2$, and $a_5$, as well as the histograms 361, 362, and 365 of occurrences of temporal differential of intensity values during the period of time $t_0$ at the respective sub-regions $a_1$, $a_2$, and $a_5$ to obtain the maximum values $m_1$, $m_2$, and $m_5$ of the temporal differential of the intensity value during the period of time $t_0$ in the respective sub-regions $a_1$, $a_2$, and $a_5$. The illumination change judging condition judgement means 223 judges a need for updating the image feature parameter value at each sub-region due to an occurrence of the illumination change according to the predetermined variance $σ_0$ and the predetermined maximum value $m_0$ for the temporal differential of the intensity value. Among a plurality (two in FIG. 11) of the value update means 233 and 235, the value update means I 233 is used for a case of the gradual illumination change, while the value update means II 235 is used for a case of the abrupt illumination change.

Now, in the first embodiment described above, whether or not to update the image feature parameter value at each sub-region has been decided according to whether the illumination change judging condition is satisfied or not. However, the illumination change can include various manners of changes depending on the causes of the changes, so that in this sixth embodiment, different manners of updating the image feature parameter values are used for different types of the illumination changes, such that the background image can be reconstructed properly in accordance with a type of the illumination change which is judged by using a plurality of illumination change judging conditions.

Namely, when there is no illumination change or when there is only a gradual illumination change, the histograms 351 and 361 as shown in FIG. 11 will be obtained, so that the variance σ and the maximum value m during the period of time $t_0$ is small as long as the period of time $t_0$ is as short as several seconds.

As the illumination change becomes more abrupt, the variance σ increases accordingly, and it becomes difficult to distinguish a case of the illumination change and a case of the cause other than the illumination change according to the value of the variance σ alone, as can be seen in the histogram 355 for a case of the abrupt illumination change and the histogram 352 for a case of the cause other than the illumination change. In order to distinguish these two cases, the maximum value m of the temporal differential df of the intensity value can be used, as this temporal differential df takes a small value for a case of the illumination change and a large value for a case of the passing of the moving object, as can be seen in the histogram 365 for a case of the abrupt illumination change and the histogram 362 for a case of the case other than the illumination change. In particular, this temporal differential df takes particularly large values at a moment of the entry of the moving object into the image and at a moment of the exit of the moving object from the image.

Thus, by using the predetermined maximum value $m_0$ for separating a case of the abrupt illumination change and a case of the passing of the moving object along with the predetermined variance $σ_0$, the illumination change judging condition judgment means 223 compares the obtained variance σ and maximum value m with the predetermined variance $σ_0$ and maximum value $m_0$, and judges it as a case of the gradual illumination change when the obtained variance σ and maximum value m are less than the predetermined variance $σ_0$ and maximum value $m_0$, respectively, or as a case of the abrupt illumination change when the obtained variance σ is greater than the predetermined variance $σ_0$ but the obtained maximum value m is less than the predetermined maximum value $m_0$, or else as a case of the passing of the moving object when the obtained variance σ and maximum value m are greater than the predetermined variance $σ_0$ and maximum value $m_0$, respectively. In a case of the gradual illumination change, the background value at each sub-region is updated by the value update means I 233, and in a case of the abrupt illumination change, the background value at each sub-region is updated by the value update means II 235, whereas in a case of the passing of the moving object, the background value at each sub-region is not updated.

Here, the value update means I 233 for a case of no illumination change or the gradual illumination change can replace the background value at each sub-region by the most frequency value of the intensity values during the period of time $t_0$, while the value update means II 235 for a case of the abrupt illumination change can replace the background value at each sub-region by the mean value of the pixel values at each sub-region in several recent frames.

Next, with reference to FIGS. 12, 13A, 13B, 14A and 14B, the seventh embodiment of the moving object extraction based on background subtraction according to the present invention will be described in detail.

Figure 12:
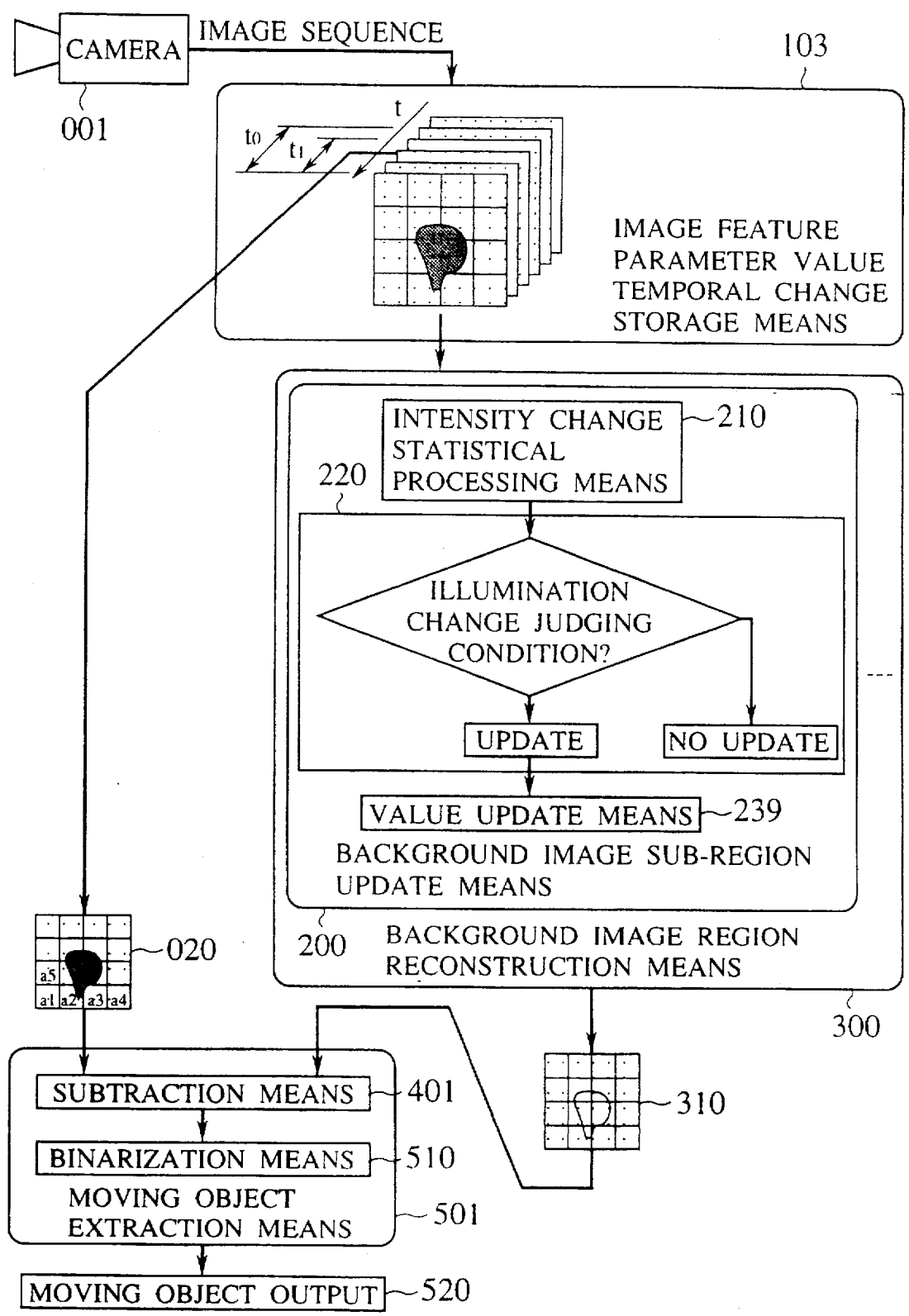
FIG. 12 is a block diagram showing a system configuration of a moving object extraction system in the seventh embodiment of the present invention.

FIG. 12 shows a system configuration of a moving object extraction system in this seventh embodiment, which generally comprises: a camera 001 for entering an image sequence of the input images; an image feature parameter value temporal change storage means 103 including frame image memories for storing image feature parameter values for the sequentially entered input images; a background image region reconstruction means 300 for reconstructing the background image according to the temporal change of the stored image feature parameter values; and a moving object extraction means 501 for obtaining a moving object output 520 from the stored image 020 at a prescribed period of time $t_1$ earlier timing and the reconstructed background image 310.

Figure 13A:
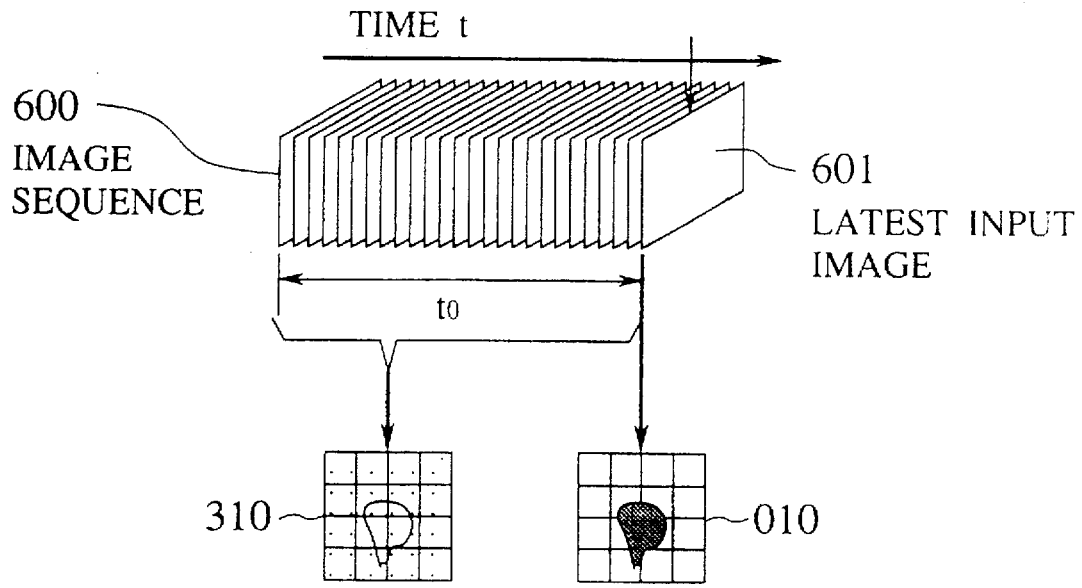
FIGS. 13A and 13B are diagrams of input image sequences for explaining a difference between the first and seventh embodiments of the present invention.
Figure 13B:
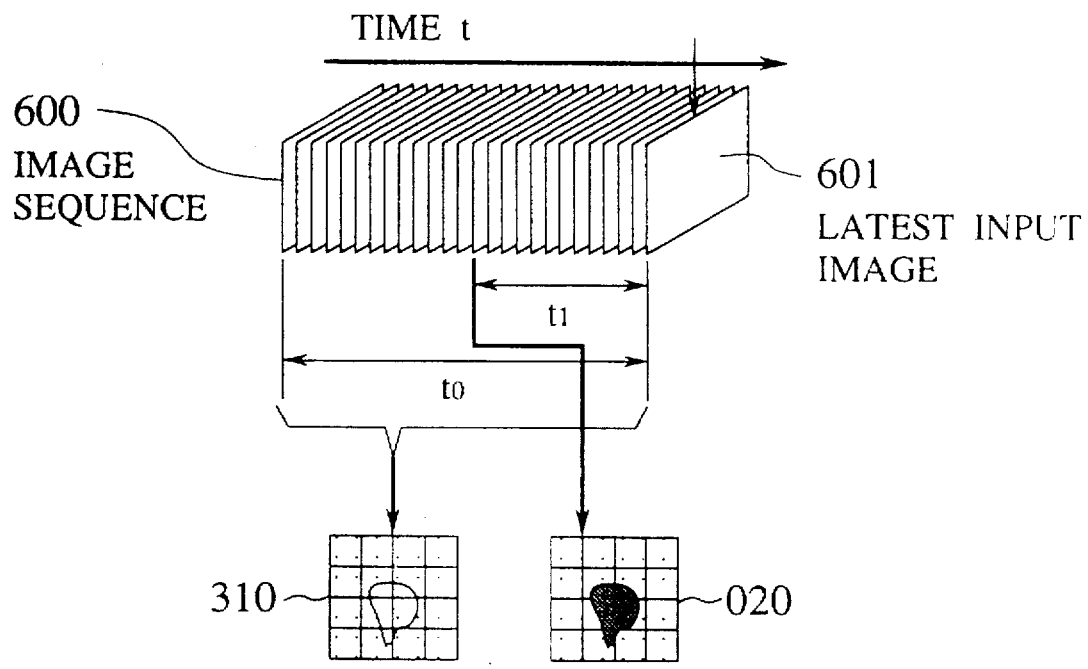

As shown in FIG. 13A, in the first embodiment described above, the image 010 to be supplied to the moving object extraction means 500 and subjected to the subtraction processing at the subtraction means 400 with respect to the reconstructed background image 310 has been the latest input image 601 among the image sequence 600 entered from the camera 001. In contrast, as shown in FIG. 13B, in this seventh embodiment, the image 020 to be supplied to the moving object extraction means 501 and subjected to the subtraction processing at the subtraction means 401 with respect to the reconstructed background image 310 is set to be the input image at the prescribed period of time $t_1$ earlier timing among the image sequence 600 entered from the camera 001.

Thus, this seventh embodiment differs from the first embodiment described above in that the input image used in the subtraction processing is different. More specifically, the input image used in the subtraction processing at the subtraction means 400 in the first embodiment described above has been the image 010 entered from the camera 001 at the immediately before the subtraction processing is to be carried out, whereas the input image used in the subtraction processing at the subtraction means 401 in this seventh embodiment is the image 020 which had been entered from the camera 001 at the timing which is the prescribed period of time $t_1$ before the subtraction processing is to be carried out and which has been stored in the image feature parameter value temporal change storage means 103.

The images stored in the image feature parameter value temporal change storage means 103 are utilized not just in the subtraction processing, but also in the background updating processing at the background image region reconstruction means 300 as in the first embodiment described above. Here, the prescribed period of time $t_0$ used in the background updating processing is set to be longer than the prescribed period of time $t_1$ used in the subtraction processing. In other words, from the point of view of the image 020, the subtraction processing using the image 020 is going to be carried out with respect to the reconstructed background image 310 which has been reconstructed according to the images ranging from the image entered at $t_0$–$t_1$ earlier timing (i.e., a past image with respect to the image 020) to the image entered at $t_1$ later timing (i.e., a future image with respect to the image 020) in this seventh embodiment.

Figure 14A:
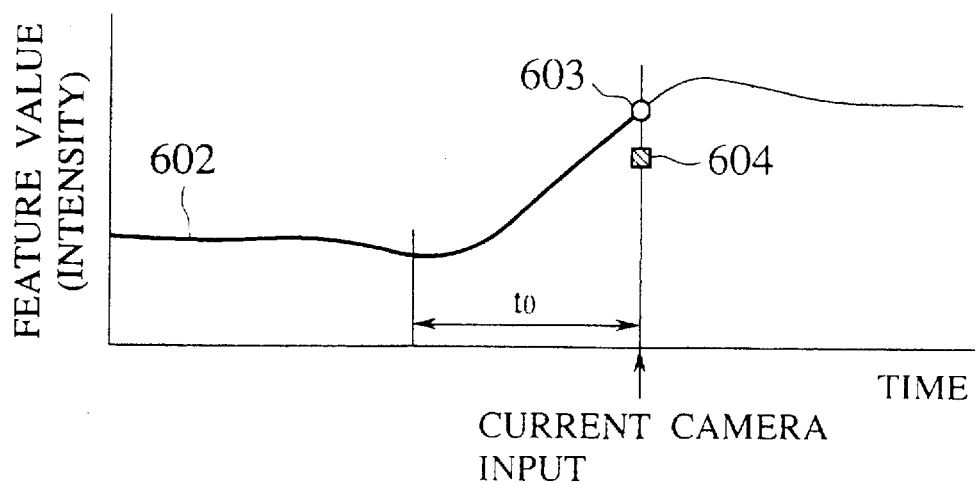
FIGS. 14A and 14B are graphs of temporal change of intensity value for explaining a difference between the first and seventh embodiments of the present invention.
Figure 14B:
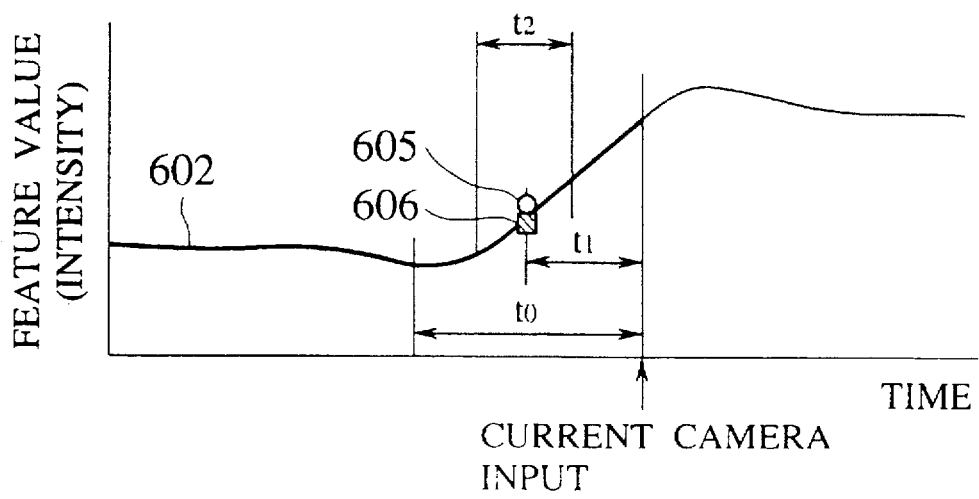

FIGS. 14A and 14B show the temporal change 602 of the intensity value in a case of the gradually brightening illumination change for the first embodiment described above and this seventh embodiment, respectively, along with the subtraction processing target image intensity level 603 or 605 for a certain sub-region and the judging background image intensity level 604 or 606 for the same sub-region judging by using the images within a given period of time, where the horizontal axis represents time and the vertical axis represents the intensity value.

As already mentioned above, in this seventh embodiment, the images subjected to the subtraction processing are the image 020 at the prescribed period of time $t_1$ earlier timing than the current timing, and the reconstructed background image 310 which has been reconstructed according to the images ranging from the image entered at $t_0$–$t_1$ earlier timing than the image 020 to the image entered at $t_1$ later timing than the image 020. Here, in a case the illumination change judging condition judgment means 220 judges the occurrence of the illumination change, the value update means 239 updates the background value at each sub-region to a new background value which is equal to the mean value of the intensity values in all the images during a certain period of time $t_2$ centered around the timing $t_1$ of the image 020 as indicated in FIG. 14B, such that the reconstructed background image 310 have the background values judging according to the images ranging from the image entered at $t_0$–$t_1$ in past with respect to the image 020 to the image entered at $t_1$ in future with respect to the image 020. The period of time $t_2$ used in this value updating processing is set to be shorter than the prescribed period of time $t_1$ used in the subtraction processing.

As shown in FIG. 14A, in the first embodiment described above, there is no image newer than the subtraction processing target image, so that the background image intensity level 604 corresponding to the subtraction processing target image intensity level 603 is going to be judging by using only the images at earlier timings than the subtraction processing target image, and consequently there is a significant gap between the background image intensity level 604 and the subtraction processing target image intensity level 603.

In contrast, as shown in FIG. 14B, in this seventh embodiment, there are images newer than the subtraction processing target image, and it can be recognized that the intensity values are changing in a single direction (from dark to bright) in a vicinity of the subtraction processing target image, so that by estimating the background image intensity level 606 corresponding to the subtraction processing target image intensity level 605 by using the images ranging from the past image to the future image with respect to the the subtraction processing target image, it is possible to obtain the background image intensity level 606 which is much closer to the subtraction processing target image intensity level 605.

Next, with reference to FIGS. 15, 16A, 16B, and 16C, the eighth embodiment of the moving object extraction based on background subtraction according to the present invention will be described in detail.

Figure 15:
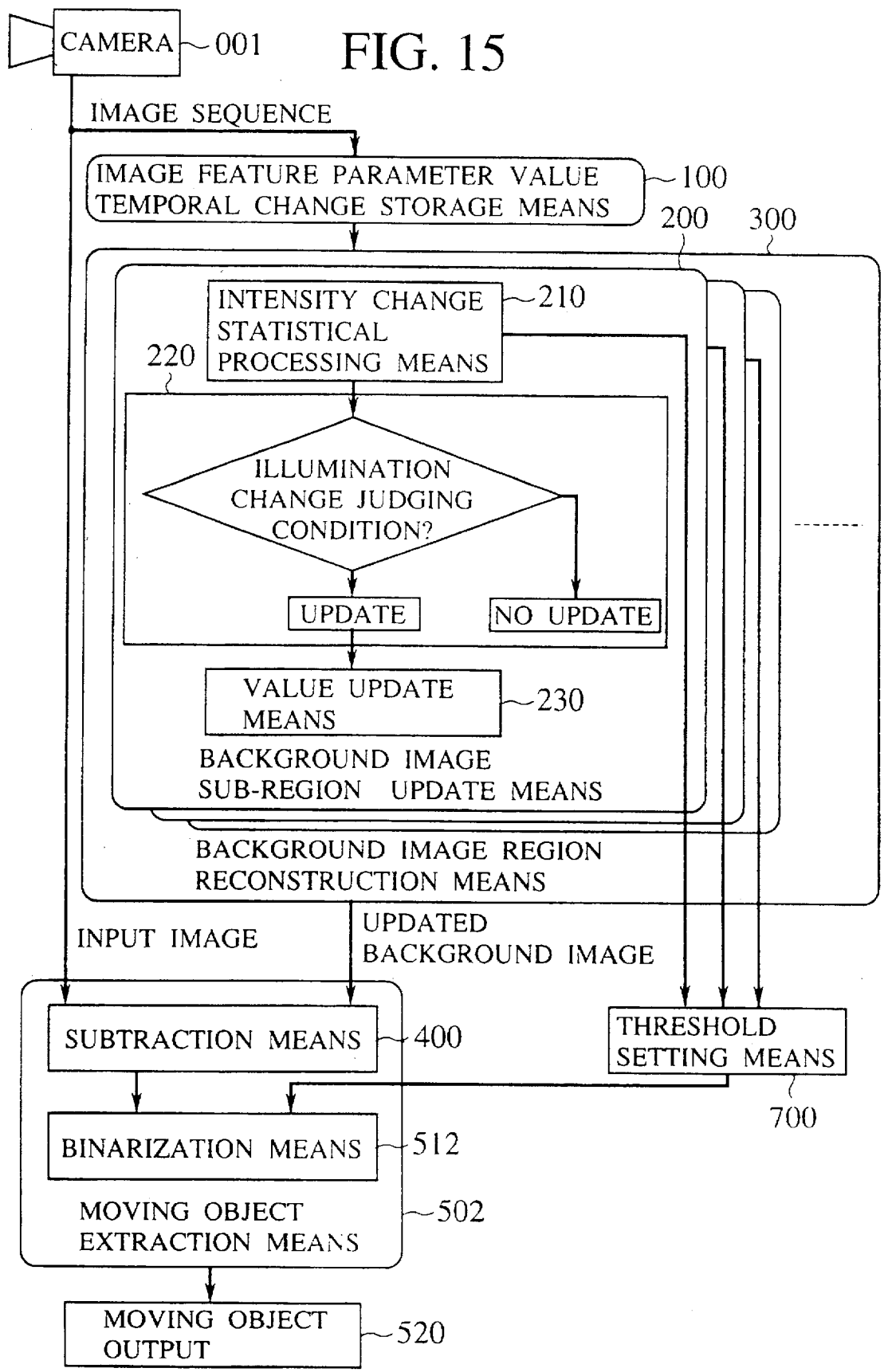
FIG. 15 is a block diagram showing a system configuration of a moving object extraction system in the eighth embodiment of the present invention.

FIG. 15 shows a system configuration of a moving object extraction system in this eighth embodiment, which differs from the first embodiment described above in that there is provided a threshold setting means 700 for setting the threshold to be used at the binarization means 512 in the moving object extraction means 502 according to the result of the statistical processing obtained by the intensity change statistical processing means 210 in the background image region reconstruction means 200. The rest of this configuration FIG. 15 is identical to that of the first embodiment described above.

When the binarization means 512 binarizes the subtraction image obtained by the subtraction means 400 from the input image and the reconstructed background image in order to extract the moving object, there are cases in which the extraction precision can be improved by setting the threshold for the binarization to be a smaller value when the intensity values in the input image and the background image are small (dark) and to be a larger value when the intensity values in the input image and the background image are large (bright). For this reason, in this eighth embodiment, the threshold setting means 700 updates the threshold for each sub-region, according to the statistical information obtained for each sub-region by the intensity change statistical processing means 210, so as to adjust the threshold used in the binarization means 512 for binarizing the subtraction image for each sub-region appropriately. In this manner, it becomes possible to carry out the moving object extraction stably, regardless of the brightness in each sub-region. Here, the updating of the threshold for each sub-region according to the statistical information for each sub-region can be realized by updating the threshold for each sub-region according to the intensity value in the background image for each sub-region, as the intensity value in the sequentially updated background image for each sub-region in turn is determined in accordance with the statistical information for each sub-region.

Figure 16A:
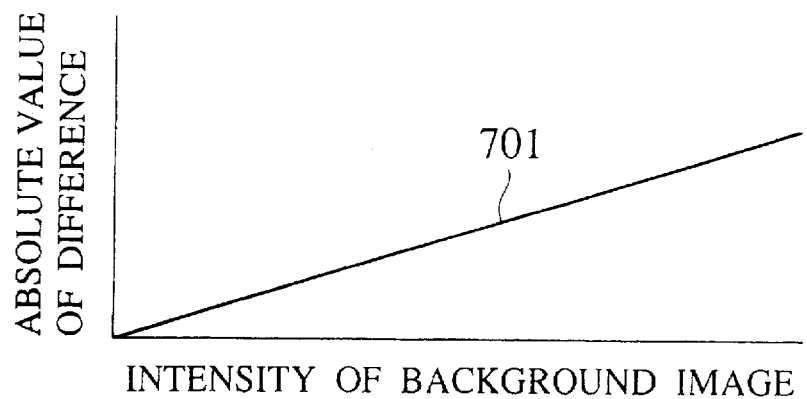
FIGS. 16A, 16B, and 16C are graphs showing exemplary threshold settings used in the moving object extraction system of FIG. 15.
Figure 16B:
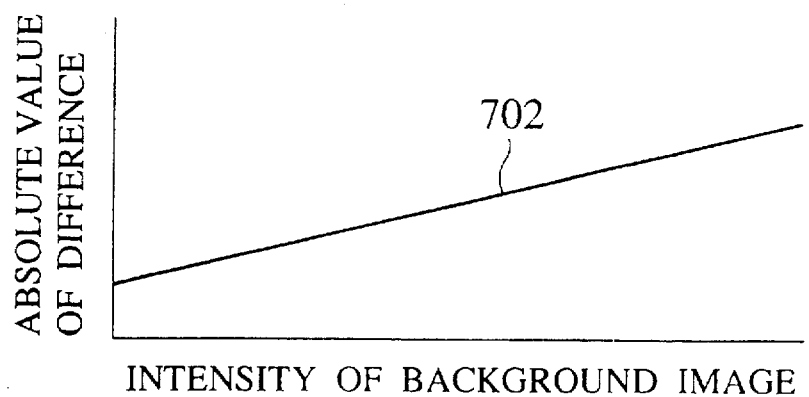
Figure 16C:
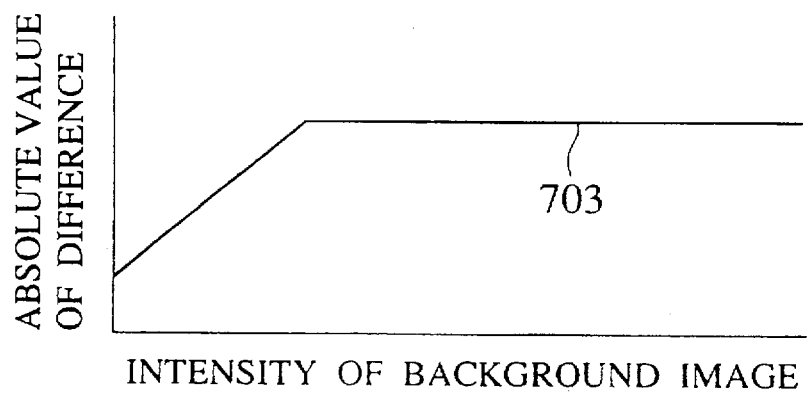

FIGS. 16A, 16B, and 16C show exemplary settings of the threshold by the threshold setting means 700 according to the intensity value in the background image which in turn depends on the statistical information obtained for each sub-region by the intensity change statistical processing means 210, where the horizontal axis represents the background image intensity value and the vertical axis represents the absolute value of the difference obtained by the subtraction processing. More specifically, FIG. 16A shows a setting which is proportional to the background image intensity value, FIG. 16B shows a setting which is also proportional to the background image intensity value but the threshold has a certain lower limit such that the threshold has some non-zero value even for the darkest background image intensity value, and FIG. 16C shows a setting which is proportional to the background image intensity values darker than a certain background image intensity value but the threshold becomes constant for the background image intensity values brighter than that certain background image intensity value.

Now, with reference to FIGS. 17 to 22, exemplary physical configurations for the apparatus to carry out the method of moving object extraction based on background subtraction as described in the first to eighth embodiments will be described in detail.

Figure 17:
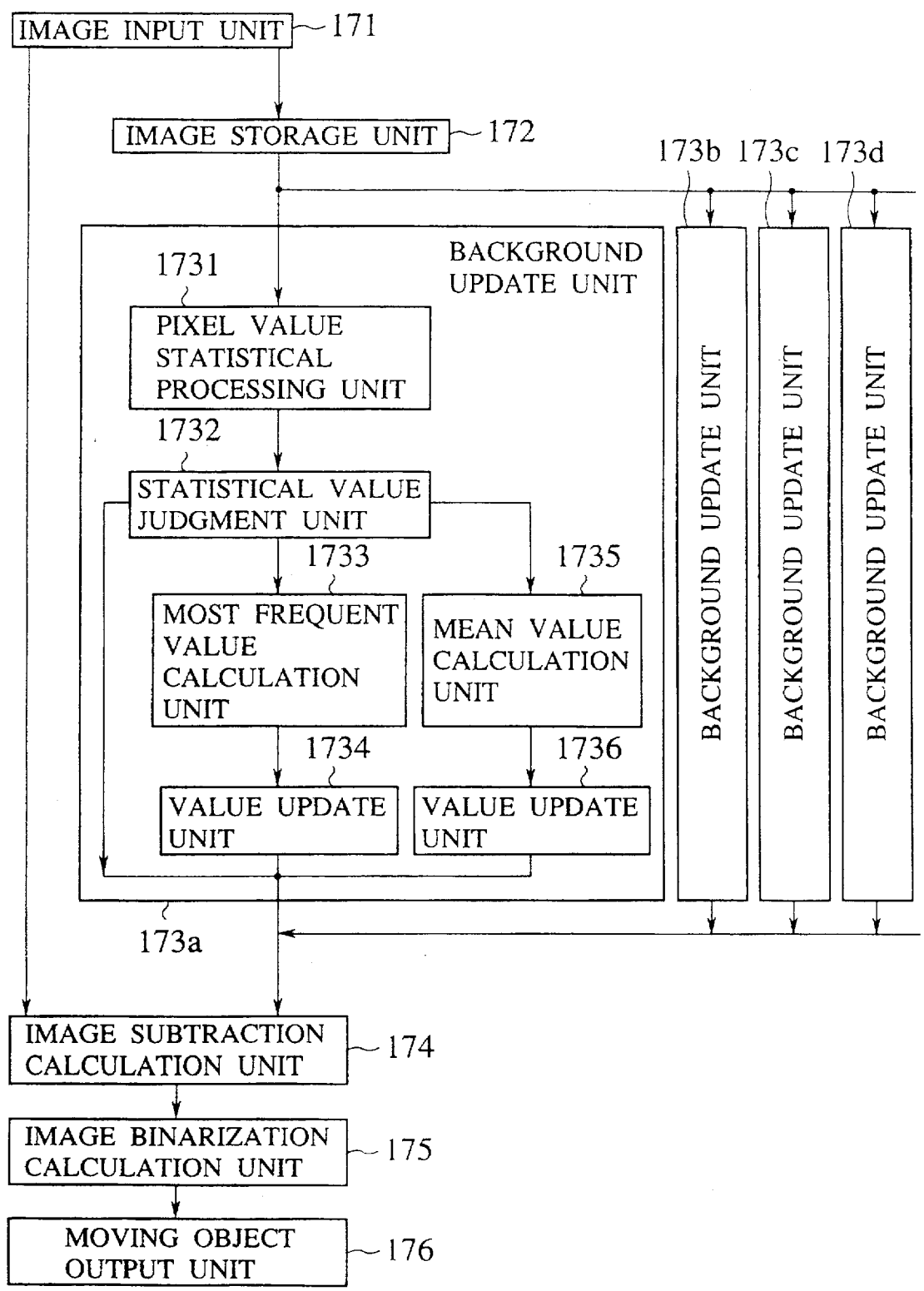
FIG. 17 is a block diagram of an exemplary physical configuration for an apparatus corresponding to the first embodiment of the present invention.

First, FIG. 17 shows a physical configuration suitable for the first embodiment of FIG. 3. This configuration of FIG. 17 comprises an image input unit 171 functioning as the camera 001 of FIG. 3, an image storage unit 172 functioning as the image feature parameter value temporal change storage means 100 of FIG. 3, a plurality of background update units 173a, 173b, 173c, etc. functioning as the background image sub-region update means 200 of the background image region reconstruction means 300 of FIG. 3, an image subtraction calculation unit 174 functioning as the subtraction means 400 of FIG. 3, an image binarization calculation unit 175 functioning as the binarization means 510 of FIG. 3, and a moving object output unit 176 for outputting the moving object output 520 of FIG. 3. The background update unit 173a further includes a pixel value statistical processing unit 1731 functioning as the intensity change statistical processing means 210 of FIG. 3, a statistical value judgement unit 1732 functioning as the illumination change judging condition judgment unit 220 of FIG. 3, a most frequent value calculation unit 1733 connected with a value update unit 1734 and a mean value calculation unit 1735 connected with a value update unit 1736 which function as the value update means 230 of FIG. 3. Each of the other background update units 173b, 173c, etc. also has a similar internal configuration as the background update unit 173a.

This physical configuration of FIG. 17 is also suitable for the third, fourth, fifth, and sixth embodiments described above.

Figure 18:
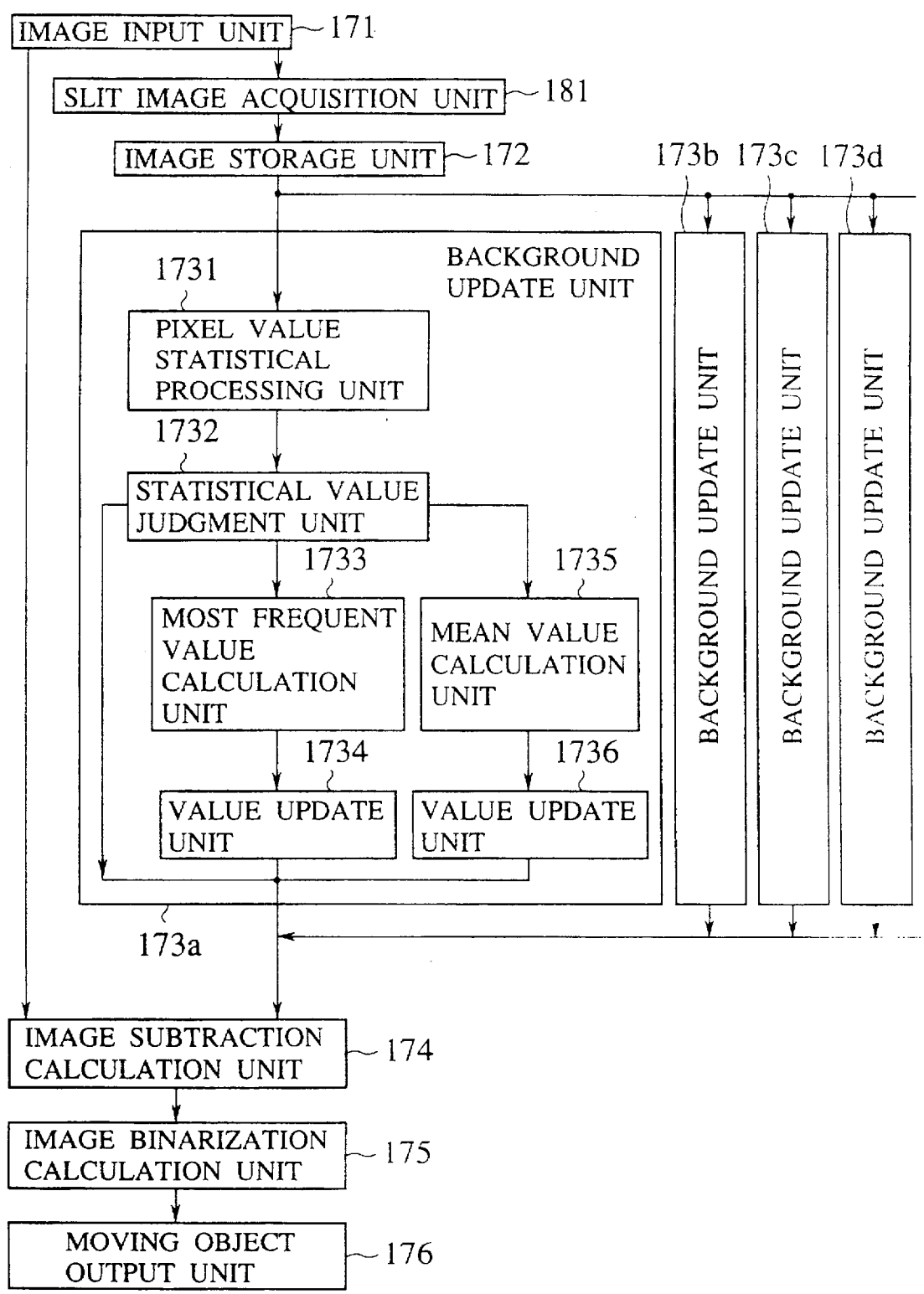
FIG. 18 is a block diagram of an exemplary physical configuration for an apparatus corresponding to the second embodiment of the present invention.

Next, FIG. 18 shows a physical configuration suitable for the second embodiment. This configuration of FIG. 18 differs from the configuration of FIG. 17 in that there is provided a slit image acquisition unit 181 for acquiring the slit image, which is located between the image input unit 171 and the image storage unit 172.

Figure 19:
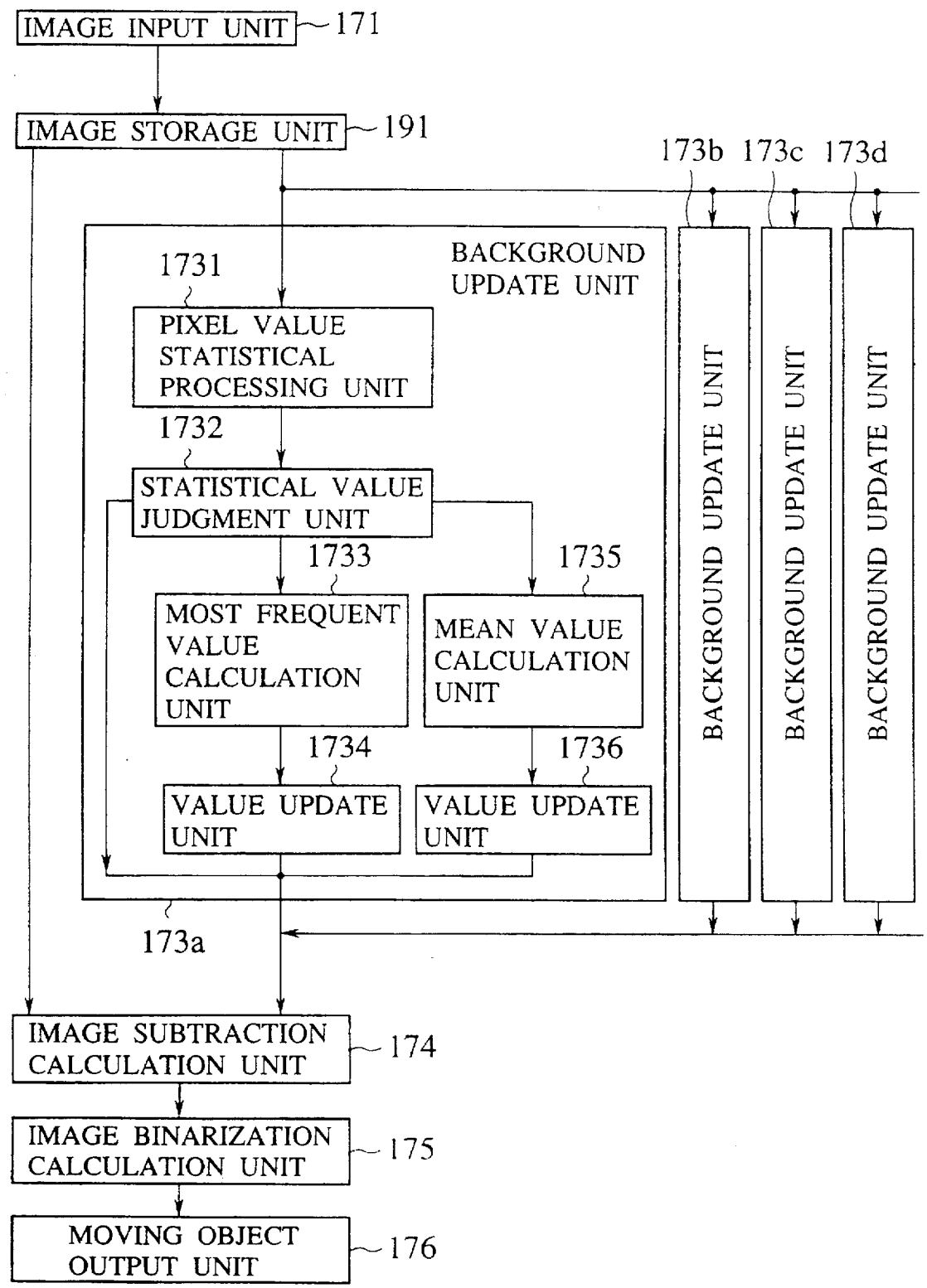
FIG. 19 is a block diagram of an exemplary physical configuration for an apparatus corresponding to the seventh embodiment of the present invention.

Next, FIG. 19 shows a physical configuration suitable for the seventh embodiment of FIG. 12. This configuration of FIG. 19 differs from the configuration of FIG. 17 in that an image storage unit 191 is provided between the image input unit 171 and the image subtraction calculation unit 174, as well as between the image input unit 171 and the background update units 173, such that the images stored in the image storage unit 191 can be supplied to the image subtraction calculation unit 174 as well as the background update units 173.

Figure 20:
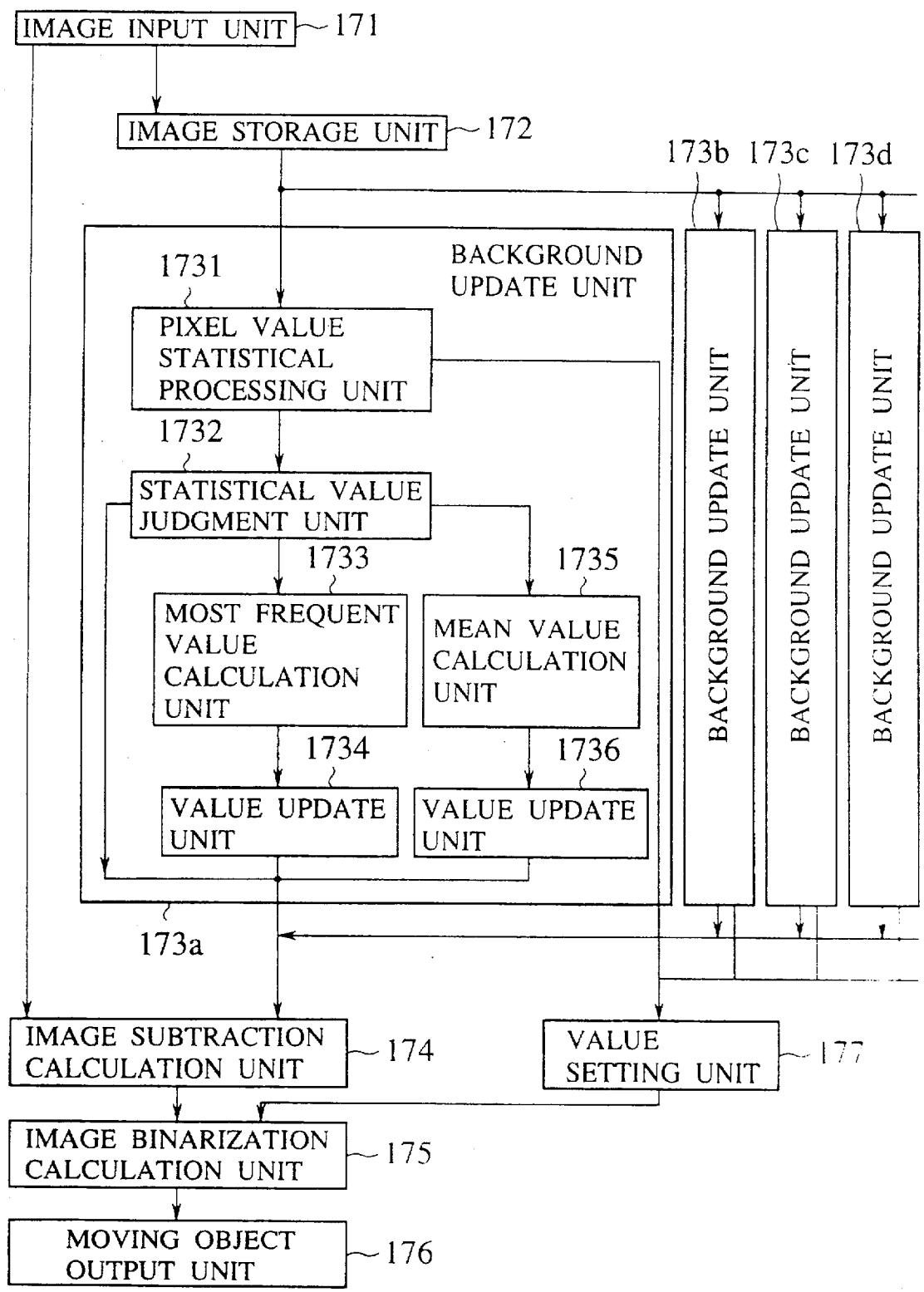
FIG. 20 is a block diagram of an exemplary physical configuration for an apparatus corresponding to the eighth embodiment of the present invention.

Next, FIG. 20 shows a physical configuration suitable for the eighth embodiment of FIG. 15. This configuration of FIG. 20 differs from the configuration of FIG. 17 in that there is provided a value setting unit 177 for setting the threshold to be used in the image binarization calculation unit 175, which is located between the pixel value statistical processing unit 1731 of each background update unit 173 and the image binarization calculation unit 175.

It is to be noted that the configuration of FIG. 17 described above may be modified as shown in FIG. 21, where there is provided a background image storage unit 178 for storing the reconstructed background image, which is located between the background update units 173 and the image subtraction calculation unit 174, and each background update unit 173 incorporates a background value read out unit 1737 for reading out the background value from the statistical value judgement unit 1732 by bypassing the most frequent value calculation unit 1733 and the mean value calculation unit 1735, in response to a control from the background image storage unit 178. Here, the value update unit 1734 is shared among the most frequent value calculation unit 1733, the mean value calculation unit 1735, and the background value read out unit 1737.

It is also to be noted that the various embodiments described above may be modified to additionally judge whether the updating of the background image itself is to be carried out or not, such that the background image updating processing can be omitted altogether in a case of no background change.

Figure 21:
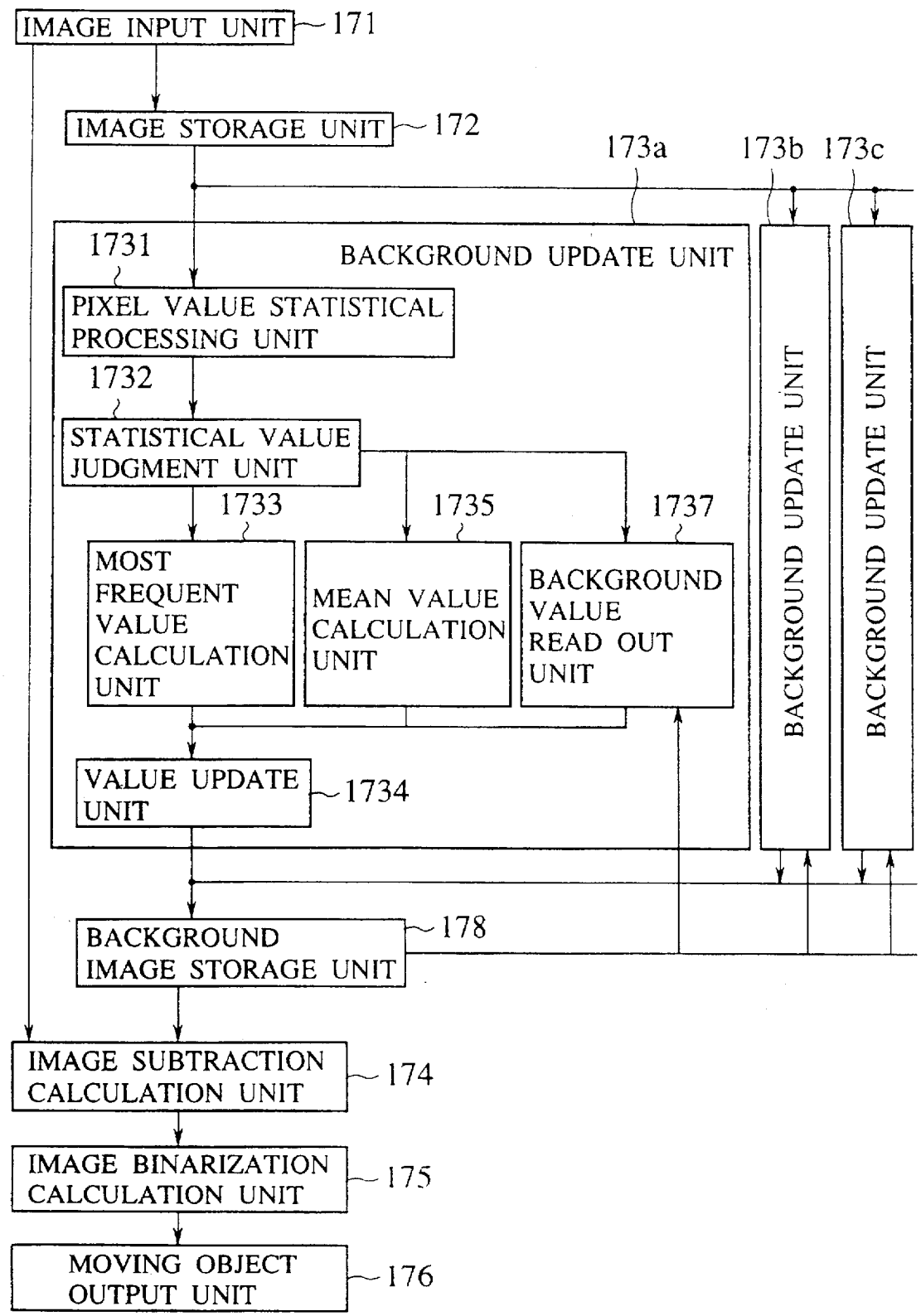
FIG. 21 is a block diagram of a modified physical configuration for an apparatus corresponding to the first embodiment of the present invention.
Figure 22:
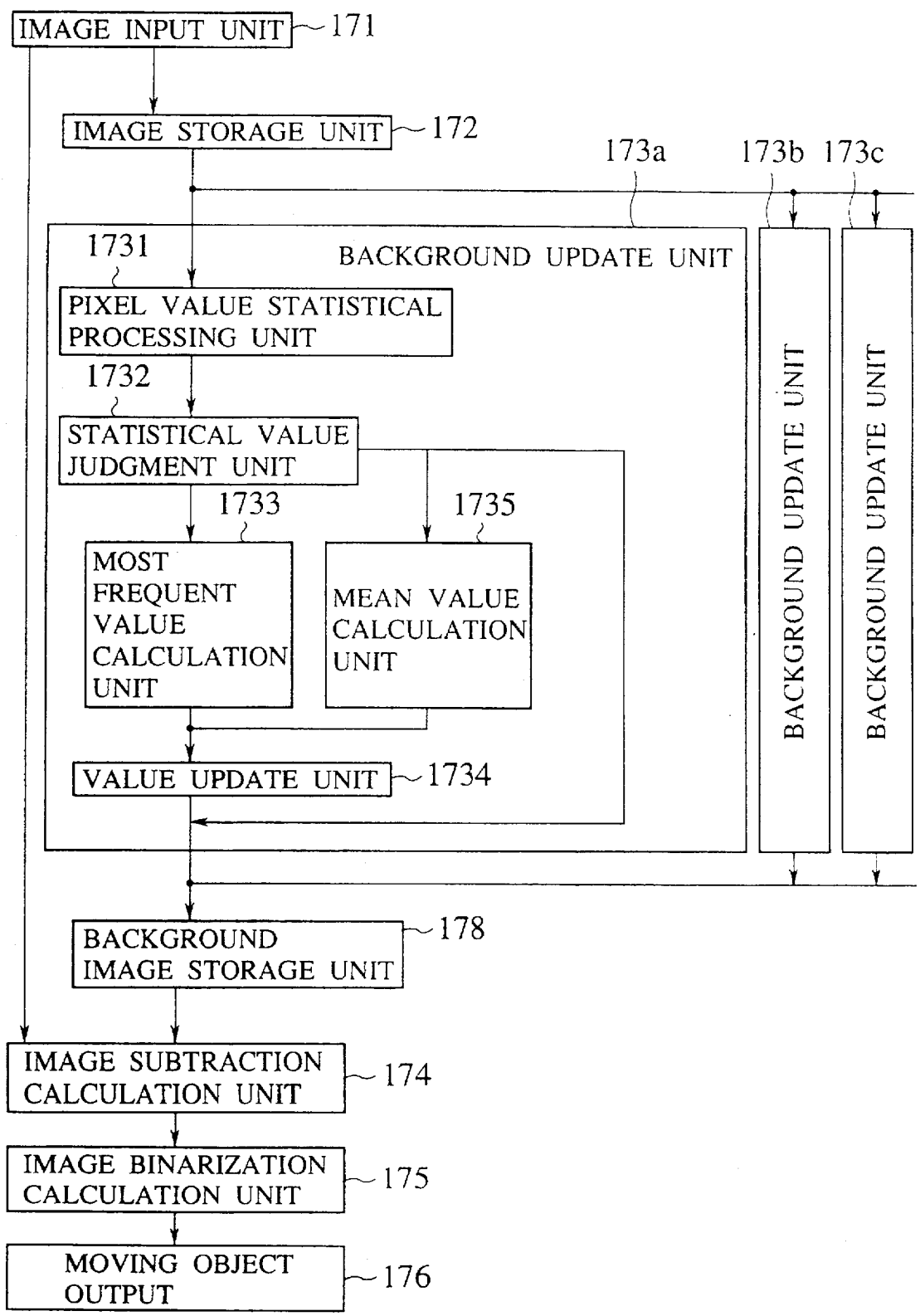
FIG. 22 is a block diagram of a further modified physical configuration for an apparatus corresponding to the first embodiment of the present invention.

In such a case, the configuration of FIG. 21 can be modified further as shown in FIG. 22, where the statistical value judgement unit 1732 makes the above noted additional judgement as to whether the updating of the background image itself is to be carried out or not, and when it is judged that the updating of the background image is not to be carried out, the most frequent value calculation unit 1733, the mean value calculation unit 1735, and the value update unit 1734 are bypassed.

As described, according to the first embodiment described above, the background image is treated as a set of sub-regions such as pixels, and whether the value change of the image feature parameter value in each sub-region is due to the illumination change or due to the passing of the moving object is judged by statistically processing the temporal change of the image feature parameter value. The illumination change in the outdoor site is usually caused by the passing of the cloud in the sky, the change of the position of the sun, the change of the shadow, etc., and mainly comprised of the intensity value change. In addition, the value change due to the illumination change is usually gradual compared with the change due to the passing of the moving object such as a human being or an automobile, so that by measuring the statistical quantity such as the variance according to the image feature parameter values within a prescribed period of time, it is possible to detect the occurrence of the value change due to the illumination change at each sub-region.

Strictly speaking, the illumination change is more or less present always, so that by carrying out the above processing continuously, it is possible to update the background image regularly in units of a prescribed period of time.

Also, as the updating processing is carried out for each sub-region, a region for applying this updating processing can be expanded to any desired region within the image. Consequently, even if the illumination change is not uniform over the entire image, it is possible to update the background image appropriately.

Moreover, in the subtraction image between the updated background image and the input image, the image feature parameter value changes at a region where the moving object is present, so that this moving object region can be stably detected by using appropriate thresholding.

Furthermore, in updating the image feature parameter value at each sub-region, the extreme value or the mean value of the histogram over a prescribed period of time corresponding to the value at each sub-region is used, so that the statistically most likely background value at that moment is used in updating, and therefore-the subsequent subtraction processing and binarization processing can be stabilized. In addition, it is possible to avoid the influence of the value fluctuation due to the imaging noise and other noise factors.

Also, according to the second embodiment described above, the sub-region is set to be a pixel in the image, and the desired region for applying the background updating processing is set to be a single line (slit) in the image, so that the space-time image formed by that line and the time axis can be produced easily at high speed. In this case, as a result of the subtraction processing, only the moving object remains in this space-time image, so that the binarization processing can also be carried out at high speed.

Also, according to the third embodiment described above, the statistical quantity such as the variance in the histogram of the values in each sub-region is relatively compared with the statistical quantity such as the variance in the histograms of the values in other sub-regions in a vicinity of that sub-region. In general, the change of the background image due to the illumination change is gradual not just in the time direction but also in the space direction as well. Consequently, by relatively comparing the change in one sub-region with the changes in the surrounding sub-regions, it is possible to carry out the updating processing by judging the change as that due to the illumination change when the change is judged to be uniform over an appropriate region on the image, Also, according to the fourth embodiment described above, the presence or absence of the illumination change is judging by the statistical processing of the value changes in n types of the image feature parameter values, so that the background updating processing can be carried out more stably. In addition, the change in the background can be analyzed more minutely by using a plurality of feature quantities, so that not just a case of the image change due to the illumination change, but also a case of the gradually changing background can also be detected and the appropriate updating can be carried out.

Moreover, the histogram of the distances of each feature vector between frames is obtained, and the presence or absence of the illumination change is detected from the statistical quantity such as the variance of this histogram. In a case of the illumination change, the vector distances between frames are relatively small, whereas even the distance between two vectors in one frame becomes large in a case of the passing of the moving object. Consequently, a case of the illumination change can be detected from this histogram, and the gradual change of the background can also be detected. from this histogram.

Also, according to the fifth embodiment described above, the characteristic curve of the n-dimensional feature vectors which change in conjunction with the illumination change is determined in advance. As mentioned above, the change due to the illumination change is mainly the intensity value change, and in a case of the intensity value change, the feature vectors move substantially along the predetermined characteristic curve. Thus, when it is judged that the feature vectors are substantially moving along this characteristic curve, it can be judged as a case of the illumination change and the background updating processing can be carried out accordingly. On the other hand, in a case of the passing of the moving object, the feature vectors largely deviate from the characteristic curve. Consequently, a case of the passing of the moving object can be clearly distinguished from a case of the illumination change.

In making the above judgment, the histogram of distances of the feature vectors from the characteristic curve is used. As noted above, the feature vectors do not deviate largely from the the characteristic curve in a case of the illumination change in general, so that the mean value of the distances is going to be small, and the variance is also not going to be very large. On the other hand, in a case of the passing of the moving object, the distances are going to be large and the variance is also going to be large. Thus, these two cases can be distinguished according to these differences. Here, by using the mean value and the variance in combination, it is possible to improve the reliability of the judgment. In addition, when the characteristic curve itself has changed as the background has changed for some reason, it is possible to generate the characteristic curve for a case of the illumination change in correspondence to the new background by estimating the change of the background.

Also, according to the sixth embodiment described above, a plurality of illumination change judging conditions are used, so that the background updating processing can be carried out according to the manner of the illumination change, and it is possible to carry out the moving object extraction accounting for various types of the illumination changes.

Also, according to the seventh embodiment described above, the subtraction processing is carried out for the updated background image and the stored past input image, and this past input image is one of the images within the prescribed period of time $t_0$ used in the updating processing, so that the updated background image can be more stable with respect to the illumination change and the change of the background itself in this subtraction processing with respect to the stored past input image, compared with a case of the subtraction processing with respect to the latest input image.

Moreover, the background image is updated by using the mean of the images centered around the subtraction processing target image, within a relatively short period of time $t_2$, so that even in a case of the abrupt illumination change, the background image can be updated stably, and in addition, the subtraction processing is carried out between the updated background image and the image for which the background can be expected to be closest, so that the stable subtraction processing can be realized.

Also, according to the eighth embodiment described above, the threshold used in the binarization processing subsequent to the subtraction processing is varied according to the illumination condition at each sub-region in the image, so that the binarization processing can be carried out stably with respect to the change of the intensity value difference between the background image and the image to be extracted caused by the change in the brightness due to the illumination condition.

In summary, according to the moving object extraction based on background subtraction according to the present invention, the following advantageous technical effects can be achieved.

(1) As the occurrence of the illumination change can be detected accurately, the background image can be updated accordingly at that point. Consequently, it is possible to realize the moving object extraction based on background subtraction which is quite robust against the illumination changes.

(2) It is possible to update the background image even in a case of the gradual background change. Consequently, it is possible to realize the stable moving object extraction.

(3) As the processing required in the present invention is simple, it can be carried out at high speed. In addition, it can be implemented in hardware to realize even faster processing such as the real time processing.

(4) The present invention can be utilized in a wide range of fields requiring the moving object extraction. In particular, it is suitable for the extraction of the human being and the automobile. As the present invention can stably detect the passing of the moving object, it is effective in the applications such as an intruder monitoring at a manufacturing plant facility and a safety monitoring in a traffic facility such as a platform at a station.

(5) By combining the slit image, the present invention can be utilized for counting of passing persons, in which case it is possible to extract the passing person regardless of the weather and the time of the measurement location, without being influenced by the noises originating from the imaging system such as a camera or the image transfer system, so that the accuracy in counting can be improved considerably.

(6) The present invention almost never lose a sight of a target moving object, so that it can be utilized effectively for the detection of the trajectory of the moving object by consecutively carrying out the moving object extraction over the entire image field.

(7) It is possible to update the background image appropriately both in a case of the gradual background change and in a case of the abrupt background change. Consequently, it is possible to realize the stable moving object extraction.

(8) As it is possible to update the background image stably even in a case of the abrupt illumination change, it is possible to realize the stable moving object extraction even in a case of the abrupt illumination change.

(9) As the background updating processing is simple, it can be carried out at high speed. This fact is particularly effective in a case of the abrupt illumination change.

(10) It is possible to realize the binarization suitable for the region extraction at the dark portion as well as at the bright portion, without being influenced by the local difference in brightness, so that it is possible to realize the stable moving object extraction even in a case involving brightness irregularity in the target region or in a case involving a large temporal change in brightness.

It is to be noted that many modifications and variations of the above embodiments may be made without departing from the novel and advantageous features of the present invention. Accordingly, all such modifications and variations are intended to be included within the scope of the appended claims.

What is claimed is:

1. A method of moving object extraction based on background subtraction, comprising the steps of:

(a) sequentially entering input images containing a moving object region to be extracted;

(b) storing temporal changes of image feature parameter values for sub-regions subdividing a frame of each input image entered at the step (a);

(c) statistically processing a temporal change of the image feature parameter values for each sub-region within a prescribed target region of the frame stored at the step (b) over a prescribed period of time $t_0$ to obtain at least one statistical quantity characterizing said temporal change, judging whether said temporal change is due to an illumination change or not according to said statistical quantity and a prescribed illumination change judging condition, and updating a background image value for said each sub-region by a new background image value according to the image feature parameter values for said each sub-region during the prescribed period of time $t_0$, so as to obtain a reconstructed background image;

(d) applying a subtraction processing to one of the input images entered at the step (a) and the reconstructed background image obtained at the step (c) to obtain a subtraction image; and (e) applying a binarization processing to the subtraction image obtained at the step (d) to extract the moving object region from the input images entered at the step (a).

2. The method of claim 1, wherein at the step (c), whether said temporal change is due to the illumination change or not is judged by obtaining a histogram of the image feature parameter values for said each sub-region over the prescribed period of time $t_0$, obtaining said statistical quantity from said histogram, and comparing said statistical quantity with a predetermined reference statistical quantity representing a case of the illumination change.

3. The method of claim 1, wherein at the step (c), the new background image value is either one of an extreme value or a mean value of the image feature parameter values for said each sub-region over the prescribed period of time $t_0$.

4. The method of claim 1, wherein at the step (c), said each sub-region is a pixel in the frame, and said prescribed target region is a slit shaped region in the frame.

5. The method of claim 1, wherein at the step (c), whether said temporal change is due to the illumination change or not is judged by obtaining a histogram of the image feature parameter values for said each sub-region over the prescribed period of time $t_0$, obtaining said statistical quantity from said histogram, and relatively comparing said statistical quantity for said each sub-region with statistical quantities for other sub-regions in a vicinity of said each sub-region.

6. The method of claim 1, wherein at the step (b), the image feature parameter values of n types of image feature parameters for the sub-regions are stored with respect to the input images sequentially entered at the step (a), where n is an integer greater than one, and at the step (c), whether said temporal change is due to the illumination change or not is judged by forming n-dimensional feature vectors from the image feature parameter values of said n types of the image feature parameters for said each sub-region over the prescribed period of time $t_0$, obtaining said statistical quantity by statistically processing a set of said n-dimensional feature vectors, and judging whether said statistical quantity satisfies the predetermined illumination change judging condition.

7. The method of claim 6, wherein at the step (c), whether said temporal change is due to the illumination change or not is judged by obtaining a histogram of distances between frames of each of said n-dimensional feature vectors over the prescribed period of time $t_0$, obtaining said statistical quantity from said histogram, and comparing said statistical quantity with a predetermined reference statistical quantity representing a case of the illumination change.

8. The method of claim 6, wherein at the step (c), whether said temporal change is due to the illumination change or not is judged by obtaining in advance a characteristic curve of said n-dimensional vectors for said each sub-region indicating a manner by which said n-dimensional vectors change in a case of the illumination change, obtaining a histogram of distances between said characteristic curve and said n-dimensional feature vectors, obtaining said statistical quantity from said histogram, and comparing said statistical quantity with a predetermined reference statistical quantity representing a case of the illumination change.

9. The method of claim 8, wherein at the step (c), said statistical quantity is at least one of a mean value of the distances in said histogram and a variance of said histogram.

10. The method of claim 8, wherein the step (c) also judges whether the illumination change is gradual or abrupt according to a motion vector of a point projecting each of said n-dimensional vectors for said each sub-region onto said characteristic curve.

11. The method of claim 1, wherein at the step (c), the prescribed illumination change judging condition includes a plurality of conditions for specifying a plurality of different manners to update the background image value for said each sub-region.

12. The method of claim 1, wherein at the step (d), the subtraction processing is applied to a latest one of the input images entered at the step (a) and the reconstructed background image obtained at the step (c).

13. The method of claim 1, wherein at the step (d), the subtraction processing is applied to one of the input images entered at a prescribed period of time $t_1$ earlier than a current timing by the step (a) and the reconstructed background image obtained at the current timing by the step (c).

14. The method of claim 13, wherein at the step (c), the new background image value is a mean value of the image feature parameter values for said each sub-region over a prescribed period of time $t_2$ centered around a timing which is the prescribed period of time $t_1$ earlier than the current timing.

15. The method of claim 1, wherein at the step (e), a threshold used in the binarization processing is set to be different for different sub-regions.

16. The method of claim 15, wherein at the step (e), the threshold used in the binarization processing for said each sub-region is sequentially updated according to a value obtained by statistically processing the temporal change of the image feature parameter values for said each sub-region over the prescribed period of time $t_0$.

17. The method of claim 1, further comprising the steps of judging whether there is any change in the background image according to the temporal change of the image feature parameter values stored at the step (b), and omitting an operation to update the background image value at the step (c) when it is judged that there is no change in the background image.

18. The method of claim 1, wherein at the step (c), said statistical quantity is at least one of a variance and a distribution shape of a histogram of the image feature parameter values for said each sub-region over the prescribed period of time $t_0$.

19. The method of claim 18, wherein at the step (c), said statistical quantity further includes a maximum value of a histogram of temporal differential of the image feature parameter values for said each sub-region over the prescribed period of time $t_0$.

20. The method of claim 1, wherein each of the input images entered at the step (a) is a color image including a plurality of color components, and the steps (b), (d), and (e) are executed for each of said plurality of color components of each input image separately.

21. An apparatus for moving object extraction based on background subtraction, comprising:

input means for sequentially entering input images containing a moving object region to be extracted;

storage means for storing temporal changes of image feature parameter values for sub-regions subdividing a frame of each input image entered by the input means;

background update means for statistically processing a temporal change of the image feature parameter values for each sub-region within a prescribed target region of the frame stored by the storage means over a prescribed period of time $t_0$ to obtain at least one statistical quantity characterizing said temporal change, judging whether said temporal change is due to an illumination change or not according to said statistical quantity and a prescribed illumination change judging condition, and updating a background image value for said each sub-region by a new background image value according to the image feature parameter values for said each sub-region during the prescribed period of time $t_0$, so as to obtain a reconstructed background image;

subtraction means for applying a subtraction processing to one of the input images entered by the input means and the reconstructed background image obtained by the background update means to obtain a subtraction image; and binarization means for applying a binarization processing to the subtraction image obtained by the subtraction means to extract the moving object region from the input images entered by the input means.

22. The apparatus of claim 21, wherein the background update means judges whether said temporal change is due to the illumination change or not by obtaining a histogram of the image feature parameter values for said each sub-region over the prescribed period of time $t_0$, obtaining said statistical quantity from said histogram, and comparing said statistical quantity with a predetermined reference statistical quantity representing a case of the illumination change.

23. The apparatus of claim 21, wherein the background update means uses the new background image value which is either one of an extreme value or a mean value of the image feature parameter values for said each sub-region over the prescribed period of time $t_0$.

24. The apparatus of claim 21, wherein said each sub-region is a pixel in the frame, and the background update means uses said prescribed target region which is a slit shaped region in the frame.

25. The apparatus of claim 21, wherein the background update means judges whether said temporal change is due to the illumination change or not by obtaining a histogram of the image feature parameter values for said each sub-region over the prescribed period of time $t_0$, obtaining said statistical quantity from said histogram, and relatively comparing said statistical quantity for said each sub-region with statistical quantities for other sub-regions in a vicinity of said each sub-region.

26. The apparatus of claim 21, wherein the storage means stores the image feature parameter values of n types of image feature parameters for said each sub-region with respect to the input images sequentially entered by the input means, where n is an integer greater than one, and the background update means judges whether said temporal change is due to the illumination change or not by forming n-dimensional feature vectors from the image feature parameter values of said n types of the image feature parameters for said each sub-region over the prescribed period of time $t_0$, obtaining said statistical quantity by statistically processing a set of said n-dimensional feature vectors, and judging whether said statistical quantity satisfies the predetermined illumination change judging condition.

27. The apparatus of claim 26, wherein the background update means judges whether said temporal change is due to the illumination change or not by obtaining a histogram of distances between frames of each of said n-dimensional feature vectors over the prescribed period of time $t_0$, obtaining said statistical quantity from said histogram, and comparing said statistical quantity with a predetermined reference statistical quantity representing a case of the illumination change.

28. The apparatus of claim 26, wherein the background update means judges whether said temporal change is due to the illumination change or not by obtaining in advance a characteristic curve of said n-dimensional vectors for said each sub-region indicating a manner by which said n-dimensional vectors change in a case of the illumination change, obtaining a histogram of distances between said characteristic curve and said n-dimensional feature vectors, obtaining said statistical quantity from said histogram, and comparing said statistical quantity with a predetermined reference statistical quantity representing a case of the illumination change.

29. The apparatus of claim 28, wherein the background update means obtains said statistical quantity which is at least one of a mean value of the distances in said histogram and a variance of said histogram.

30. The apparatus of claim 28, wherein the background update means also judges whether the illumination change is gradual or abrupt according to a motion vector of a point projecting each of said n-dimensional vectors for said each sub-region onto said characteristic curve.

31. The apparatus of claim 21, wherein the background update means uses the prescribed illumination change judging condition which includes a plurality of conditions for specifying a plurality of different manners to update the background image value for said each sub-region.

32. The apparatus of claim 21, wherein the subtraction means applies the subtraction processing to a latest one of the input images entered by the input means and the reconstructed background image obtained by the background update means.

33. The apparatus of claim 21, wherein the subtraction means applies the subtraction processing to one of the input images entered at a prescribed period of time $t_1$ earlier than a current timing by the input means and the reconstructed background image obtained at the current timing by the background update means.

34. The apparatus of claim 33, wherein the background update means uses the new background image value which is a mean value of the image feature parameter values for said each sub-region over a prescribed period of time $t_2$ centered around a timing which is the prescribed period of time $t_1$ earlier than the current timing.

35. The apparatus of claim 21, further comprising setting means for setting a threshold used in the binarization processing by the binarization means to be different for different sub-regions.

36. The apparatus of claim 35, wherein the setting means sequentially updates the threshold used in the binarization processing for said each sub-region according to a value obtained by statistically processing the temporal change of the image feature parameter values for said each sub-region over the prescribed period of time $t_0$.

37. The apparatus of claim 21, wherein the background update means also judges whether there is any change in the background image according to the temporal change of the image feature parameter values stored by the storage means, and omits an operation to update the background image value when it is judged that there is no change in the background image.

38. The apparatus of claim 21, wherein the background update means uses said statistical quantity which is at least one of a variance and a distribution shape of a histogram of the image feature parameter values for said each sub-region over the prescribed period of time $t_0$.

39. The apparatus of claim 38, wherein the background update means uses said statistical quantity which further includes a maximum value of a histogram of temporal differential of the image feature parameter values for said each sub-region over the prescribed period of time $t_0$.

40. The apparatus of claim 21, wherein each of the input images entered by the input means is a color image including a plurality of color components, and each of the storage means, the subtraction means, and the binarization means function for each of said plurality of color components of each input image separately.

* * * * *

UNITED STATES PATENT AND TRADEMARK OFFICE
CERTIFICATE OF CORRECTION

PATENT NO. : 5,748,775
DATED : May 5, 1998
INVENTOR(S) : Tsuchikawa, et al.

It is certified that error appears in the above-identified patent and that said Letters Patent is hereby corrected as shown below:

Col. 9, ln. 29 reads "the sub-regions $a_1$, $a_4$, and as will be" and should read --the sub-regions $a_1$, $a_4$, and $a_5$ will be--

Col. 11, ln. 57 reads "obsensed by an ultrasonic" and should read --obtained by an ultrasonic--

Col. 12, ln. 27 reads "time to at the sub-region" and should read --time $t_0$ at the sub-region--

Col. 14, ln. 33 reads "sub-regions $a_1$, $a_2$, and as during" and should read --sub-regions $a_1$, $a_2$, and $a_5$ during--

Signed and Sealed this

Twenty-seventh Day of October, 1998

Attest:

BRUCE LEHMAN

Attesting Officer

Commissioner of Patents and Trademarks